(12) United States Patent
Donahue

(10) Patent No.: US 10,730,583 B2
(45) Date of Patent: Aug. 4, 2020

(54) RECONFIGURABLE FOOT CLIP APPARATUS AND METHOD OF USE

(71) Applicant: Kevin Donahue, Dallas, TX (US)

(72) Inventor: Kevin Donahue, Dallas, TX (US)

( * ) Notice: Subject to any disclaimer, the term of this patent is extended or adjusted under 35 U.S.C. 154(b) by 0 days.

(21) Appl. No.: 15/786,166

(22) Filed: Oct. 17, 2017

(65) Prior Publication Data

US 2019/0111997 A1   Apr. 18, 2019

(51) Int. Cl.
   *B62M 3/08*   (2006.01)

(52) U.S. Cl.
   CPC .............. *B62M 3/083* (2013.01); *B62M 3/086* (2013.01); *Y10T 74/217* (2015.01)

(58) Field of Classification Search
   CPC ........ B62M 3/083; B62M 3/086; B62M 3/08; Y10T 74/217; Y10T 74/2168; A63C 13/001; A63C 9/00; A63C 9/14; A63C 9/16; A63C 9/20
   See application file for complete search history.

(56) References Cited

U.S. PATENT DOCUMENTS

| | | | |
|---|---|---|---|
| 589,988 A * | 9/1897 | Young | B62M 3/086 74/594.6 |
| 3,808,910 A | 5/1974 | Desbois | |
| 4,237,628 A | 12/1980 | Etancelin | |
| D262,873 S | 2/1982 | Okajima | |
| D275,846 S | 10/1984 | Buchanan | |
| D286,993 S | 12/1986 | Kotamaki | |
| 4,638,685 A | 1/1987 | Cigolini | |
| 4,762,019 A | 8/1988 | Beyl | |
| D302,259 S | 7/1989 | Konzorr | |
| D308,840 S | 6/1990 | Tackles | |
| 4,945,787 A | 8/1990 | Bigolin | |
| D323,478 S | 1/1992 | Ueda | |
| 6,035,743 A | 3/2000 | Gapinski | |
| D424,644 S | 5/2000 | Kiniry | |
| D440,618 S | 4/2001 | McKenzie | |
| 6,510,764 B2 | 1/2003 | Vito | |
| 6,513,309 B1 | 2/2003 | Morgante | |
| 7,000,500 B2 | 2/2006 | Pyles | |
| D572,321 S | 7/2008 | Clark | |

(Continued)

FOREIGN PATENT DOCUMENTS

WO   WO 2016048161 A1 *   3/2016

*Primary Examiner* — Jeremy R Severson
(74) *Attorney, Agent, or Firm* — Polsinelli PC; Adam C. Rehm

(57) ABSTRACT

A reconfigurable foot clip having a foot receiver having (i) a base with a foot abutment surface and a bicycle abutment surface on opposite sides of the base, and (ii) a center axis extending from a proximal end to a distal end of the foot receiver. The reconfigurable foot clip also includes a pair of sidewalls extending upward from the foot abutment surface, each of the pair of sidewalls have an uppermost perimeter portion extending toward another one of the pair of sidewalls. The reconfigurable foot clip also includes a fastening member (i) having a bicycle abutment wall extending downward from the bicycle abutment surface, and (ii) operable to secure the reconfigurable foot clip to a portion of a bicycle in one of a plurality of modes, each of the plurality of modes defined by an orientation of the foot clip and the bicycle.

20 Claims, 21 Drawing Sheets

(56) References Cited

U.S. PATENT DOCUMENTS

| | | | |
|---|---|---|---|
| 7,509,757 B2 * | 3/2009 | Monsees | A43B 11/00 36/122 |
| 7,938,040 B2 | 5/2011 | Deng | |
| D794,142 S | 8/2017 | Zhou | |

* cited by examiner

RECONFIGURABLE FOOT CLIP APPARATUS AND METHOD OF USE

BACKGROUND

1. Field

The present inventive concept generally relates to exercise equipment, and more particularly, to a reconfigurable foot clip apparatus for exercise equipment, and a method of using the foot clip apparatus.

2. Description of Related Art

A conventional bicycle may secure a user's foot to the bicycle via a conventional device, which only functions to restrict movement of the user's foot relative to the bicycle while the user is riding the bicycle. Indeed, such conventional devices merely maintain the user's foot in a standard position relative to the bicycle, and do not otherwise effect the user's interaction with the bicycle.

Personal trainers are generally interested in keeping their clients engaged in personal fitness by providing new exercises as well as variations for traditional exercises, thereby enhancing their clients' workout experience. Personal trainers are also interested in providing workouts that are more efficient, thereby allowing their clients to meet their workout goals as quickly and as easily as possible.

Accordingly, there is a need for exercise equipment and methods of use that enhance a user's workout experience, optimize efficiency of a workout, and have simple designs that are easy to use.

SUMMARY

The present inventive concept satisfies the aforementioned need by providing a reconfigurable foot clip. The foot clip of the present inventive concept generally includes a foot receiver, a pair of sidewalls, and a fastening member. The foot clip of the present inventive concept is operable to secure a user's foot to a bicycle in one of a plurality of modes defined by an orientation of the foot clip and the bicycle, which dictates how the user is able to ride the bicycle.

The aforementioned may be achieved in an aspect of the present inventive concept by providing a method of using a reconfigurable foot clip. The method may include a step of securing the reconfigurable foot clip of the present inventive concept to a portion of a bicycle. The foot clip may include a foot receiver having (i) a base with a foot abutment surface and a bicycle abutment surface on opposite sides of the base, and/or (ii) a center axis extending from a proximal end to a distal end of the foot receiver. The foot clip may also include a pair of sidewalls. One or both of the pair of sidewalls may extend upward from the foot abutment surface. One or both of the pair of sidewalls may each of have an uppermost perimeter portion extending toward another one of the pair of sidewalls. The foot clip may also include a fastening member (i) having a bicycle abutment wall extending downward from the bicycle abutment surface, and (ii) operable to secure the reconfigurable foot clip to a portion of a bicycle in one of a plurality of modes, each of the plurality of modes defined by an orientation of the foot clip and the bicycle.

The foregoing is intended to be illustrative and is not meant in a limiting sense. Many features of the embodiments may be employed with or without reference to other features of any of the embodiments. Additional aspects, advantages, and/or utilities of the present inventive concept will be set forth in part in the description that follows and, in part, will be apparent from the description, or may be learned by practice of the present inventive concept.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the present inventive concept is not limited to the precise embodiments and features shown. The accompanying drawings, which are incorporated in and constitute a part of this specification, illustrate an implementation of apparatuses consistent with the present inventive concept and, together with the description, serve to explain advantages and principles consistent with the present inventive concept.

DETAILED DESCRIPTION

Figure 1:
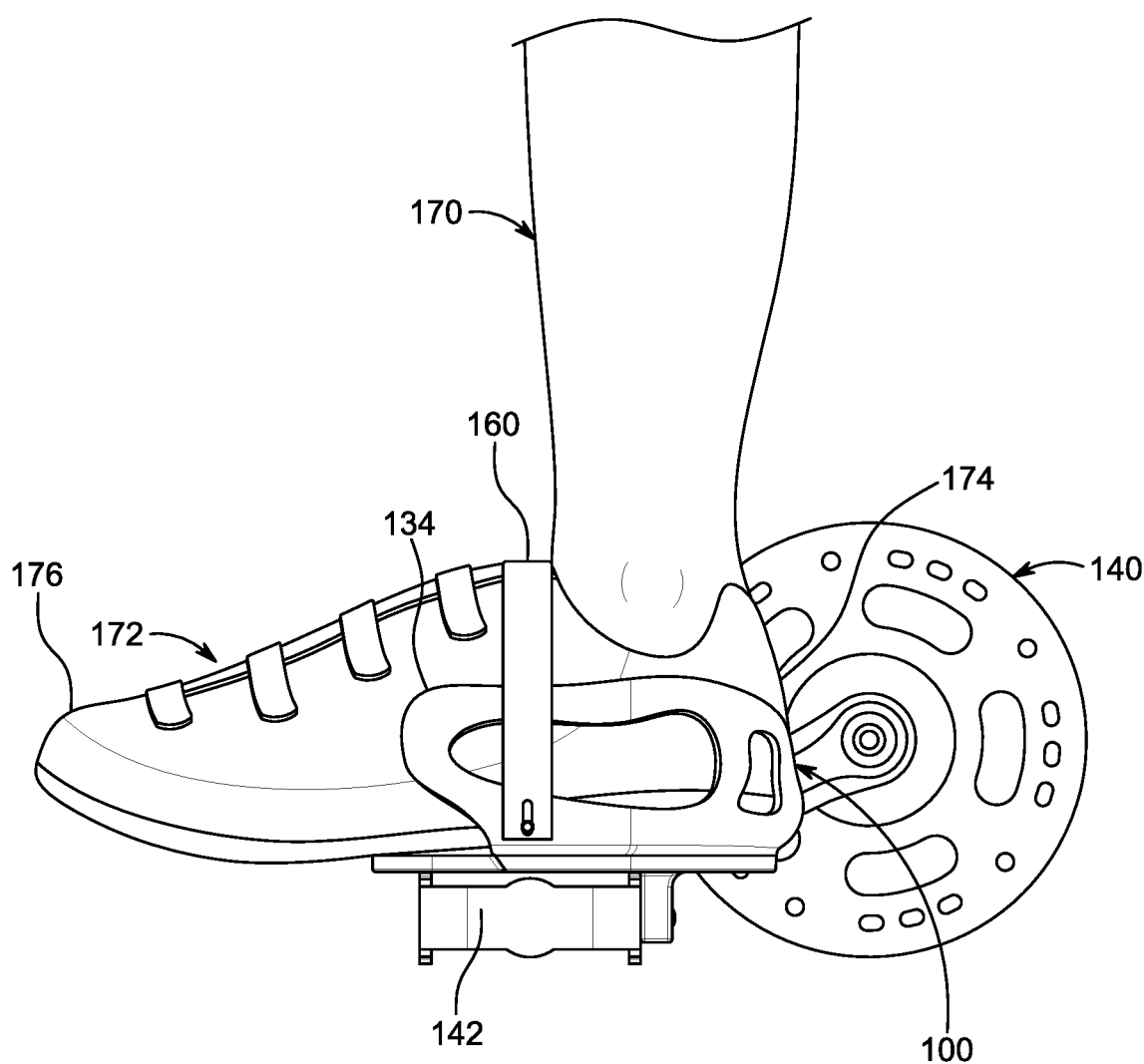
FIG. 1 is a diagram illustrating a right, side elevation view of a reconfigurable foot clip with a bicycle and a user in one mode.

It is to be understood that the present inventive concept is not limited in its application to the details of construction and to the embodiments of the components set forth in the following description or illustrated in the drawings. The figures and written description are provided to teach any person skilled in the art to make and use the inventions for which patent protection is sought. The present inventive concept is capable of other embodiments and of being practiced and carried out in various ways. Persons of skill in the art will appreciate that the development of an actual commercial embodiment incorporating aspects of the present inventive concept will require numerous implementations—specific decisions to achieve the developer's ultimate goal for the commercial embodiment. While these efforts may be complex and time-consuming, these efforts, nevertheless, would be a routine undertaking for those of skill in the art of having the benefit of this disclosure.

I. Terminology

The phraseology and terminology employed herein are for the purpose of description and should not be regarded as limiting. For example, the use of a singular term, such as, "a" is not intended as limiting of the number of items. Also, the use of relational terms such as, but not limited to, "top," "bottom," "left," "right," "upper," "lower," "down," "up," and "side," are used in the description for clarity in specific reference to the figures and are not intended to limit the scope of the present inventive concept or the appended claims. Further, it should be understood that any one of the features of the present inventive concept may be used separately or in combination with other features. Other systems, methods, features, and advantages of the present inventive concept will be, or become, apparent to one with skill in the art upon examination of the figures and the detailed description. It is intended that all such additional systems, methods, features, and advantages be included within this description, be within the scope of the present inventive concept, and be protected by the accompanying claims.

Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure, as described herein, are not essential for its practice. Likewise, other systems, methods, features, and advantages of the present inventive concept will be, or become, apparent to one with skill in the art upon examination of the figures and the description. It is intended that all such additional systems, methods, features, and advantages be included within this description, be within the scope of the present inventive concept, and be encompassed by the claims.

Lastly, the terms "or" and "and/or," as used herein, are to be interpreted as inclusive or meaning any one or any combination. Therefore, "A, B or C" or "A, B and/or C" mean any of the following: "A," "B," "C"; "A and B"; "A and C"; "B and C"; "A, B and C." An exception to this definition will occur only when a combination of elements, functions, steps or acts are in some way inherently mutually exclusive.

II. General Architecture

Turning to FIGS. 1-12, a reconfigurable foot clip 100 is illustrated. The foot clip 100 is operable for use with exercise equipment, which, in the exemplary embodiment, is a portion of a bicycle 140. It is foreseen, however, that the foot clip 100 may be used with other exercise equipment without deviating from the scope of the present inventive concept. In the exemplary embodiment, the foot clip 100 is secured to a pedal 142 of the bicycle 140.

The foot clip 100 generally includes a foot receiver 120, a pair of sidewalls 130 extending from the foot receiver 120, and a fastening member 150. The foot receiver 120 is operable to receive a portion of a user's foot 172 during use and the pair of sidewalls 130 is operable to cradle and hold the user's foot 172 in the foot clip 100. The fastening member 150 is operable to fasten the foot clip 100 to the pedal 142.

Figure 5:
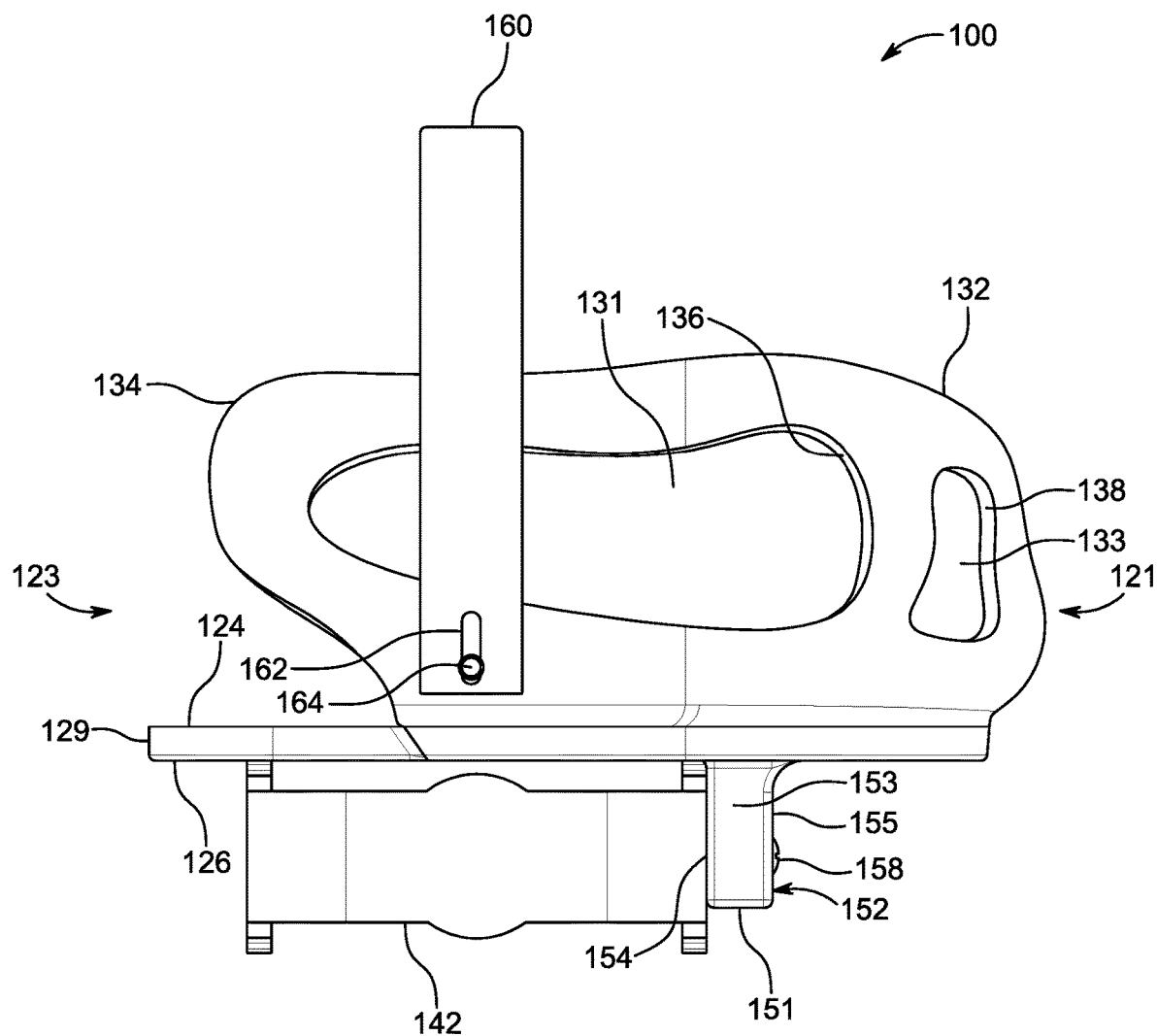
FIG. 5 is a right side elevation view of the reconfigurable foot clip and the portion of the bicycle of FIG. 1.
Figure 6:
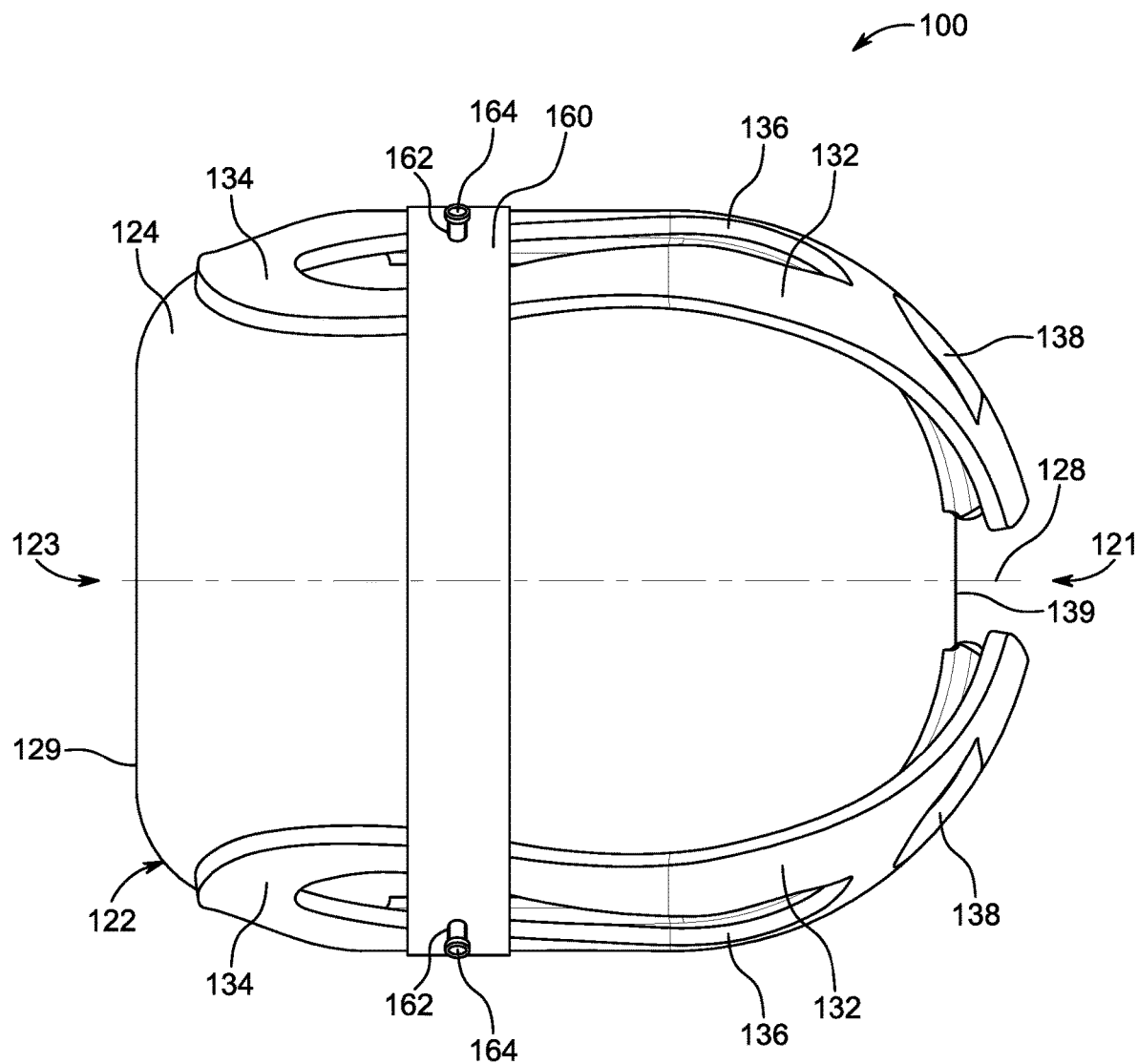
FIG. 6 is a top plan view of the reconfigurable foot clip of FIG. 1.
Figure 7:
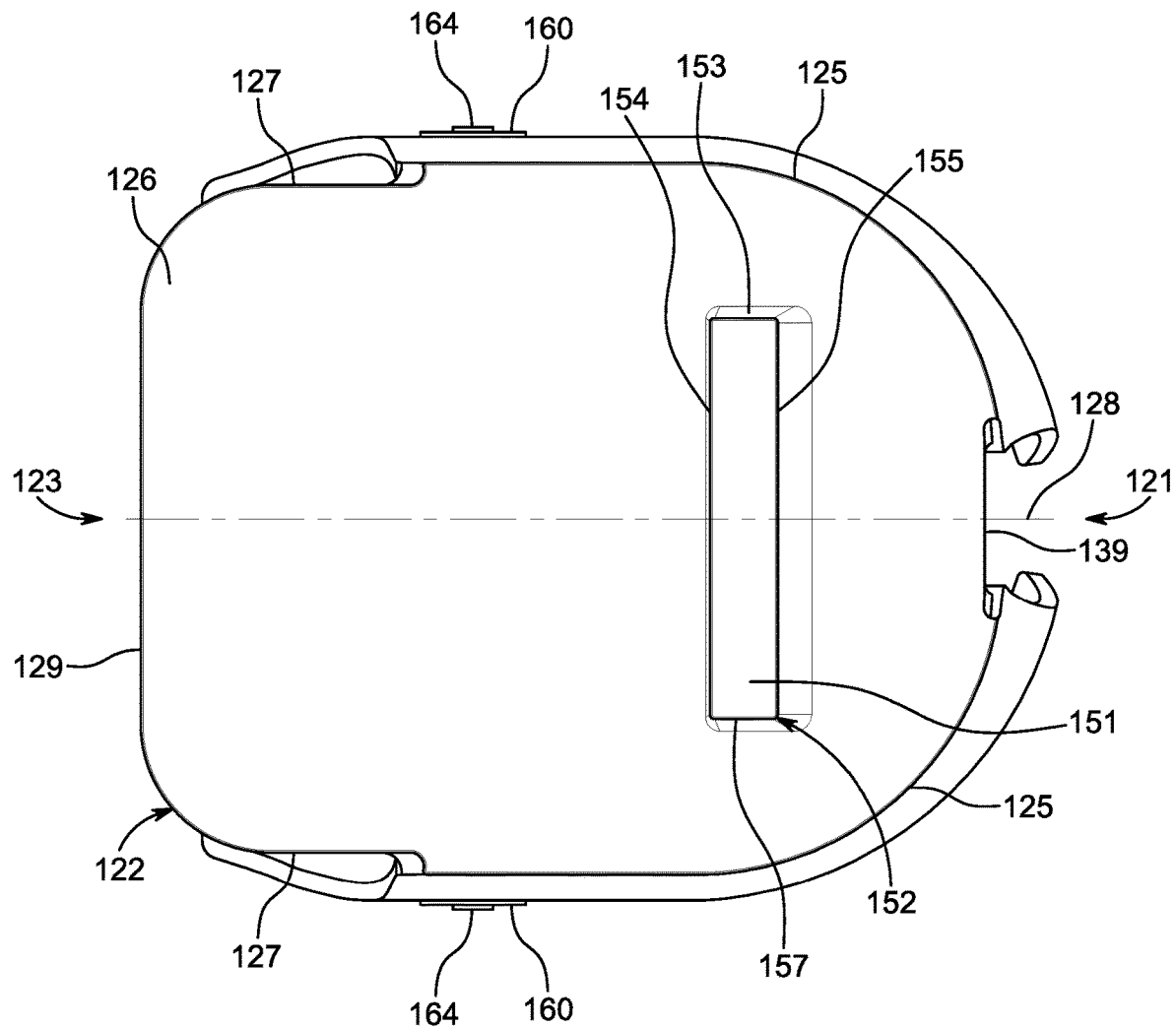
FIG. 7 is a bottom plan view of the reconfigurable foot clip of FIG. 1.

As shown more clearly in FIGS. 5-7, the foot receiver 120 includes a base 122 having a foot abutment surface 124 and a bicycle abutment surface 126 on opposite sides of the base 122. The foot receiver 120 may also have a center axis 128 extending from a proximal end 121 to a distal end 123 of the foot receiver 120, wherein the proximal end 121 is opposite the distal end 123. Portions of the bicycle abutment surface 126 abut the pedal 142 after installation. It is foreseen that the foot abutment surface 124 may include a surface providing grip to the user's foot 172 or a non-slip surface to prevent a user's foot 172 from slipping out of the foot clip 100. For example, the foot abutment surface 124 may have a rubberized surface.

The base 122 is be generally horseshoe shaped, as shown in the top plan view of FIG. 6, with a first pair of edges 125 at the proximal end 121 extending and curving away from the center axis 128. Each of the first pair of edges 125 then extend parallel to each other, defining a first width. The first pair of edges 125 then curves inwards to each other and connect to a second pair of edges 127 extending parallel to each other having a second width less than the first width. The second pair of edges 127 then curves towards each other and connects at the center axis 128, creating a flat edge 129 at the distal end 123. It is foreseen that the base 122 may be any shape including, but not limited to, square, triangular, circular, oval, or rectangular.

The reconfigurable foot clip 100 also includes a pair of sidewalls 130 extending upward from the foot abutment surface 124, as shown in FIGS. 3-6 and 8-10. Each pair of sidewalls 130 has an uppermost perimeter portion 132 extending toward another one of the pair of sidewalls 130. The pair of side walls 130 are operable to cradle and secure a user's foot 172 to the foot clip 100 by partially enclosing the user's foot 172 to the foot clip 100. In one example, the pair of sidewalls 130 cradles a user's heel 174. In another example, the pair of sidewalls 130 cradles a user's toes 176.

Figure 8:
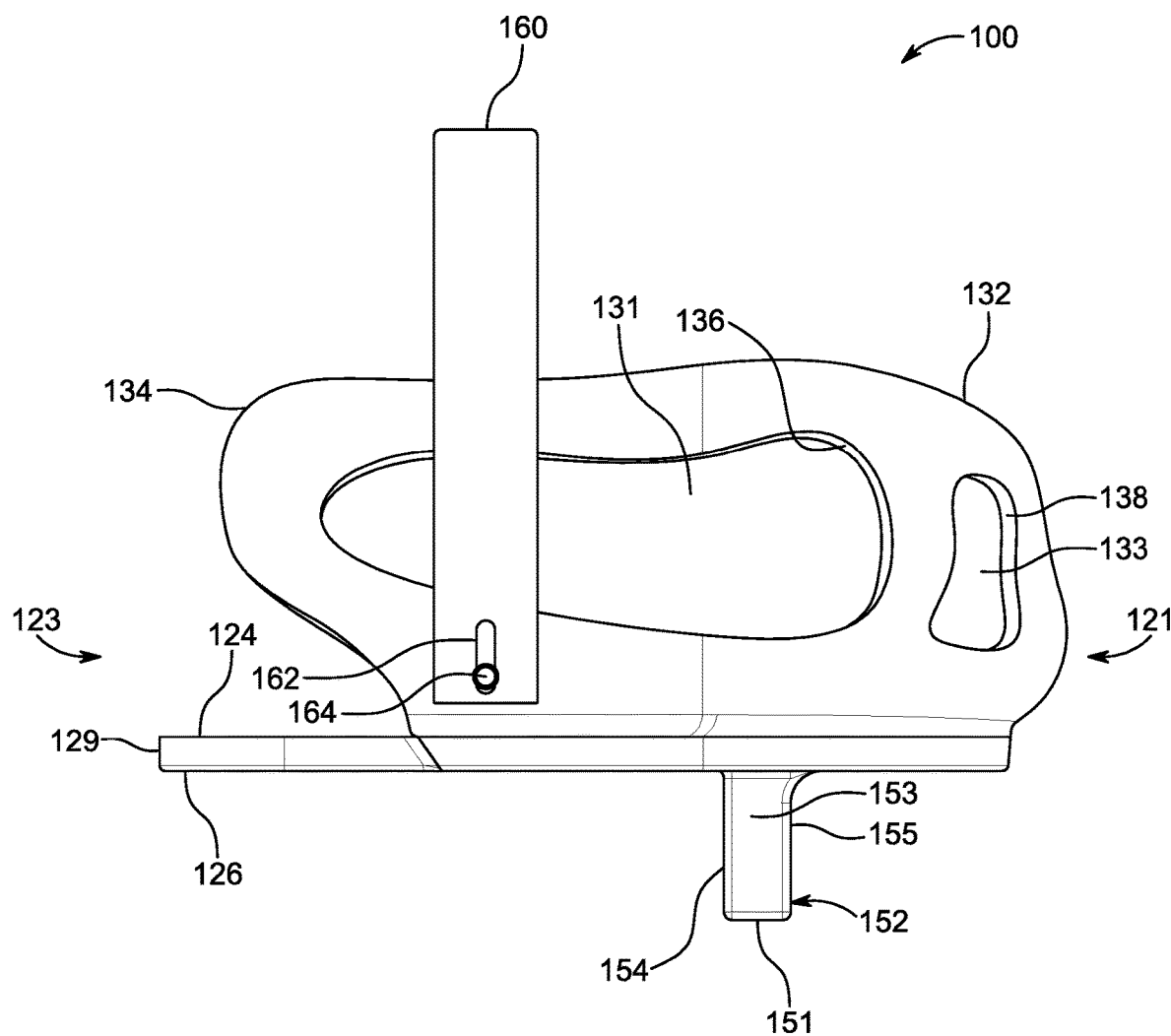
FIG. 8 is a right side elevation view of the reconfigurable foot clip of FIG. 1.

Each pair of sidewalls 130 includes a wing 134 extending towards the distal end 123. The wing 134 extends above and over the base 122 such that the wing 134 and the base 122 are not connected, as shown in FIG. 8. The wing 134 provides additional side support to the user's foot 172 during use and also provides support for proper position and technique. For example, if a user's foot 172 is angled on the pedal 142, the user's full heel or toes may not be contacting the pedal, which may result in loss of power to the bicycle and inadvertent exercising of non-targeted muscles. It is foreseen that each of the pair of sidewalls 130 may not include a wing 134 or may include a wing 134 connected to the base 122. It is also foreseen that one of the pair of sidewalls 130 may have a wing 134 while the other of the pair of sidewalls 130 does not have a wing.

Figure 9:
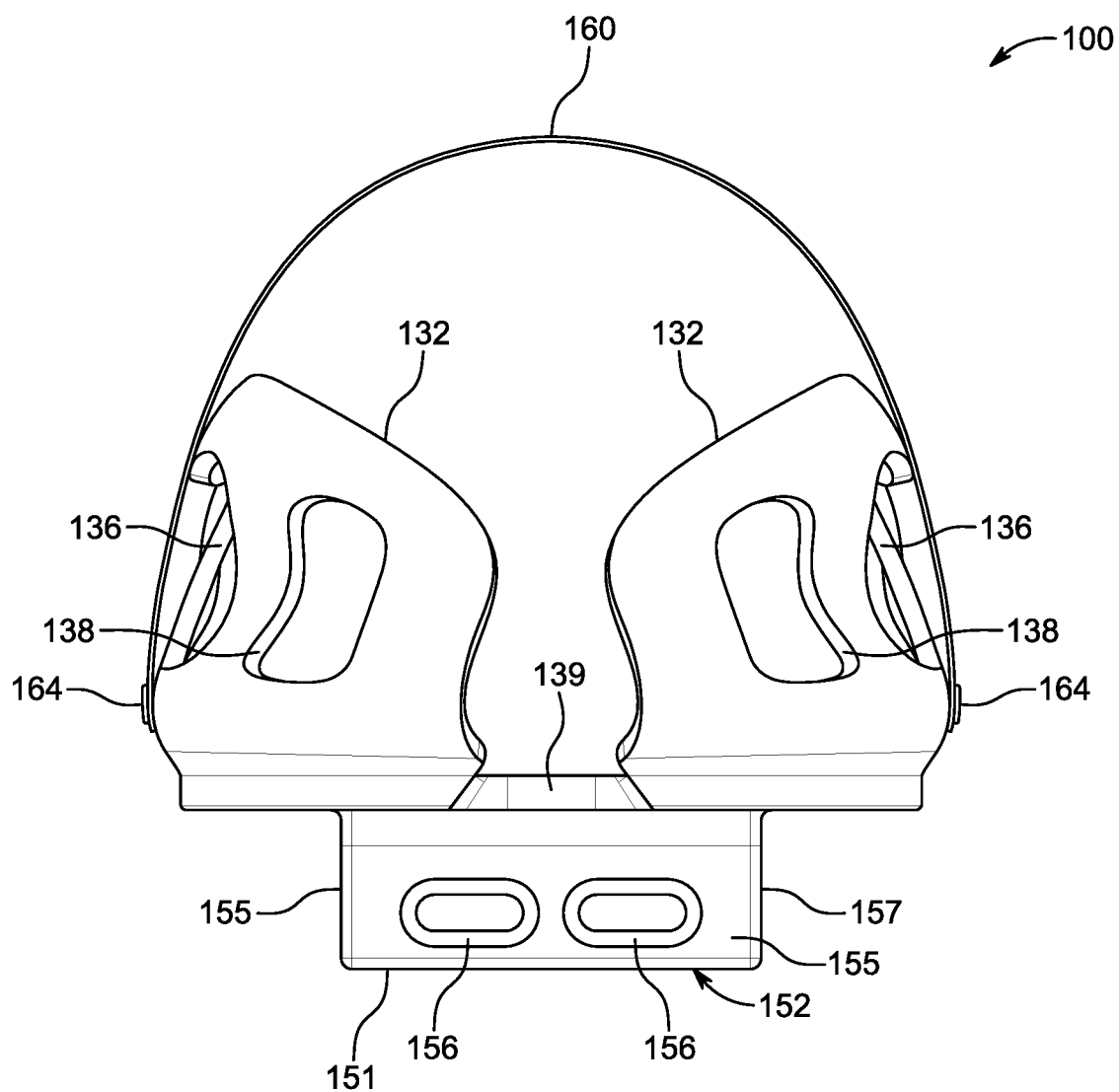
FIG. 9 is a front side elevation view of the reconfigurable foot clip of FIG. 1.
Figure 10:
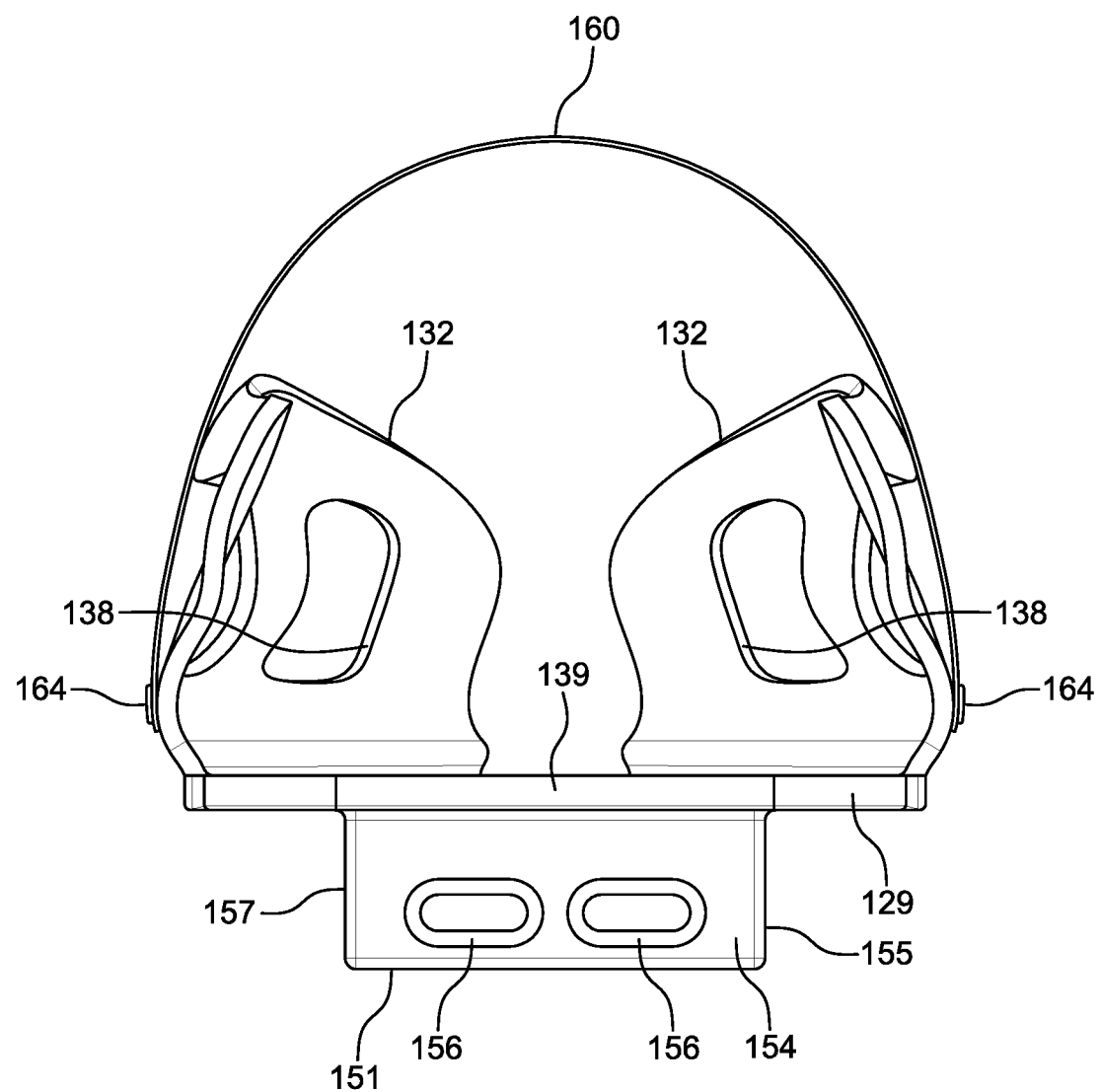
FIG. 10 is a rear side elevation view of the reconfigurable foot clip of FIG. 1.
Figure 11:
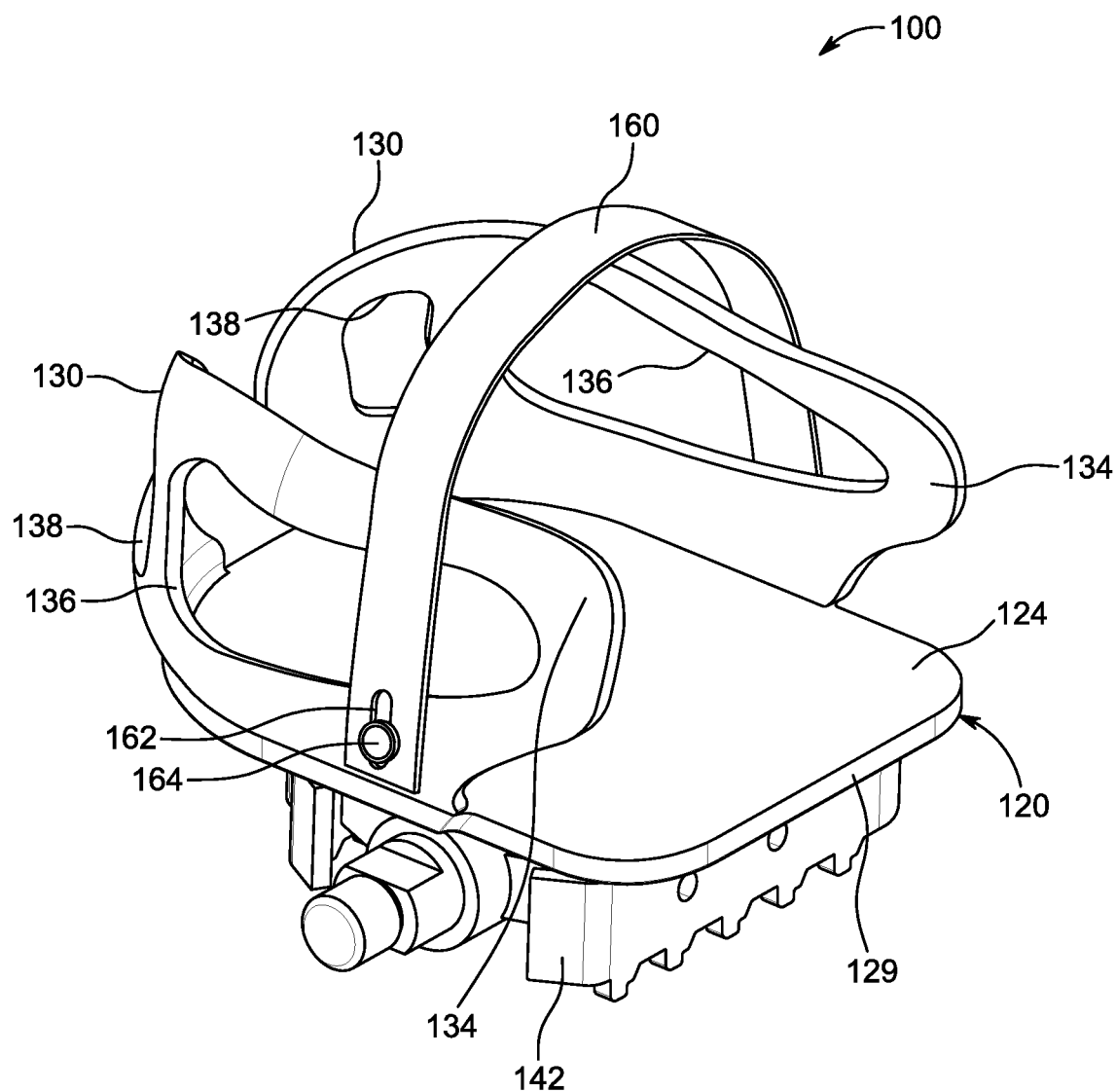
FIG. 11 is a rear, top, left side perspective of the reconfigurable foot clip of FIG. 1 with a strap in one configuration.
Figure 12:
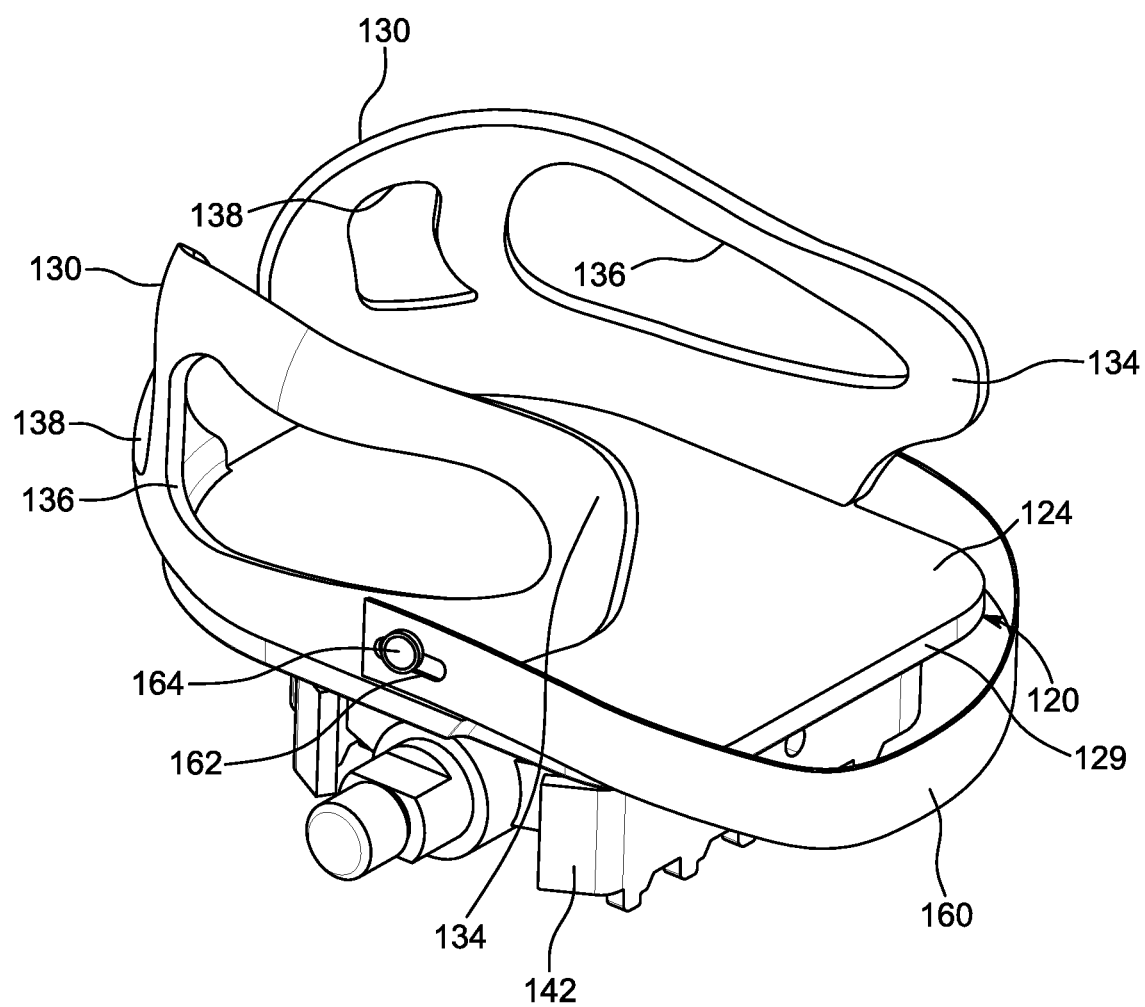
FIG. 12 is a rear, top, left side perspective of the reconfigurable foot clip of FIG. 1 with the strap in another configuration.
Figure 13:
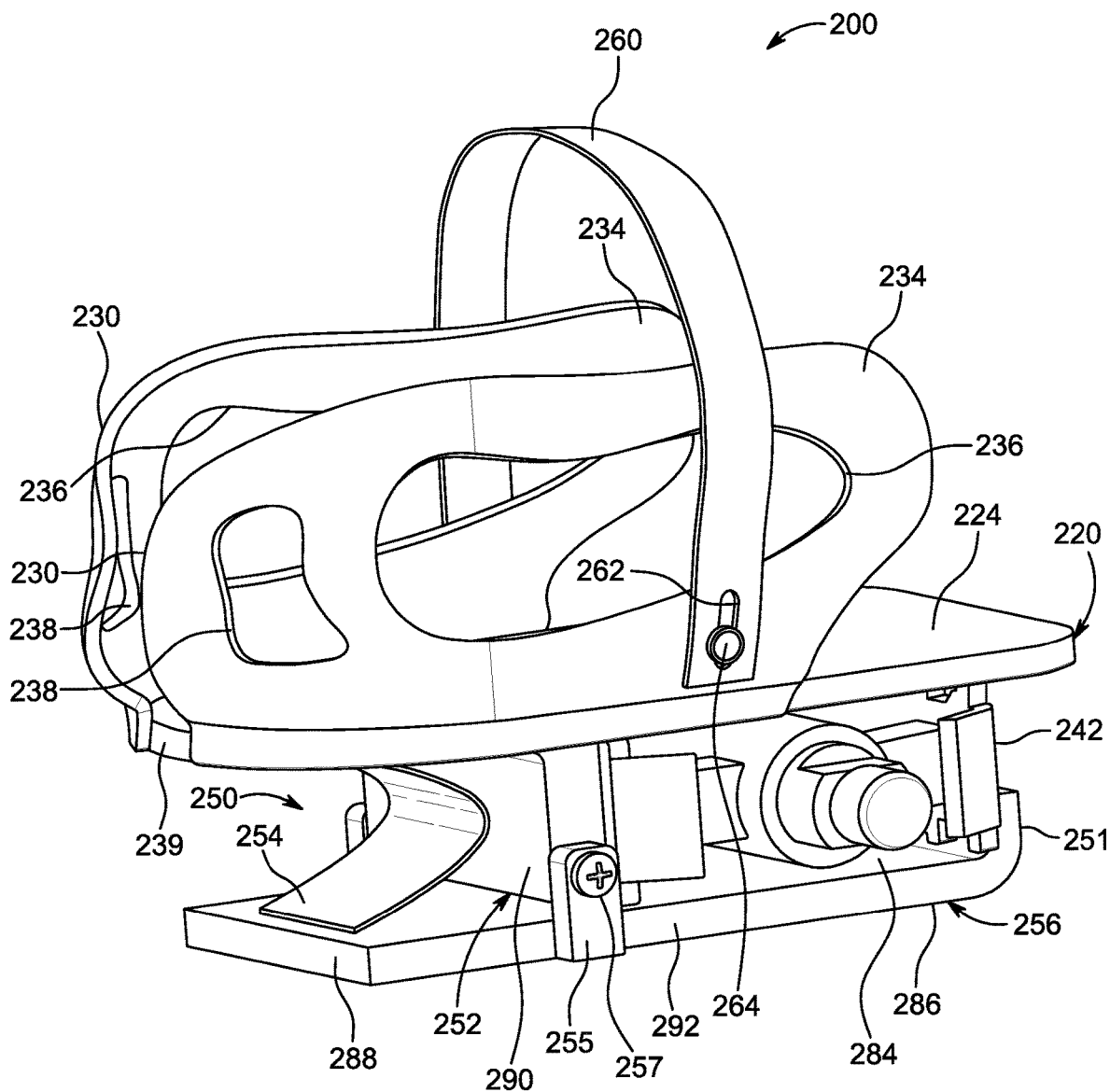
FIG. 13 is a diagram illustrating a front, top, left side perspective view of another reconfigurable foot clip with a portion of a bicycle.

Each pair of sidewalls 130 also includes a first aperture 131 having a first aperture edge 136 and a second aperture 133 having a second aperture edge 138. The first aperture 131 is larger than the second aperture 138 and extends into the wing 134. The first aperture 131 is generally shaped as an elongated oval with the first aperture edge 136 being more circular closer to the second aperture 133 and tapered in the wing 134, as shown in FIG. 5. The second aperture 133 is positioned near the proximal end 121 and generally kidney shaped, as shown in FIG. 9. The first aperture 131 and the second aperture 133 provide for flexibility in the sidewalls 130, resulting in a better fit for a larger variety of sizes and shape, as well as breathability to the user's foot 172. It is foreseen that the first aperture 131 and the second aperture 133 may be any shape or size. It is also foreseen that the second aperture 133 may be larger than the first aperture 131 or that the second aperture 133 may be equal in size and/or shape than the first aperture 131.

The pair of sidewalls 130 does not connect, which also allows for more flexibility. As shown in FIGS. 6 and 9, the side walls extend along the first pair of edges 125 towards the proximal end 121 and terminate near the center axis 128, leaving a gap 139. The gap 139 allows for the pair of sidewalls 130 to extend away from each other for a larger foot or extend towards each other to create a tighter fit for a smaller foot. Near the distal end 123, the pair of sidewalls 130 terminate before the flat edge 129, allowing for an area where user's foot 172 can be inserted into the foot clip 100. It is foreseen that the pair of sidewalls 130 may be connected.

Figure 2:
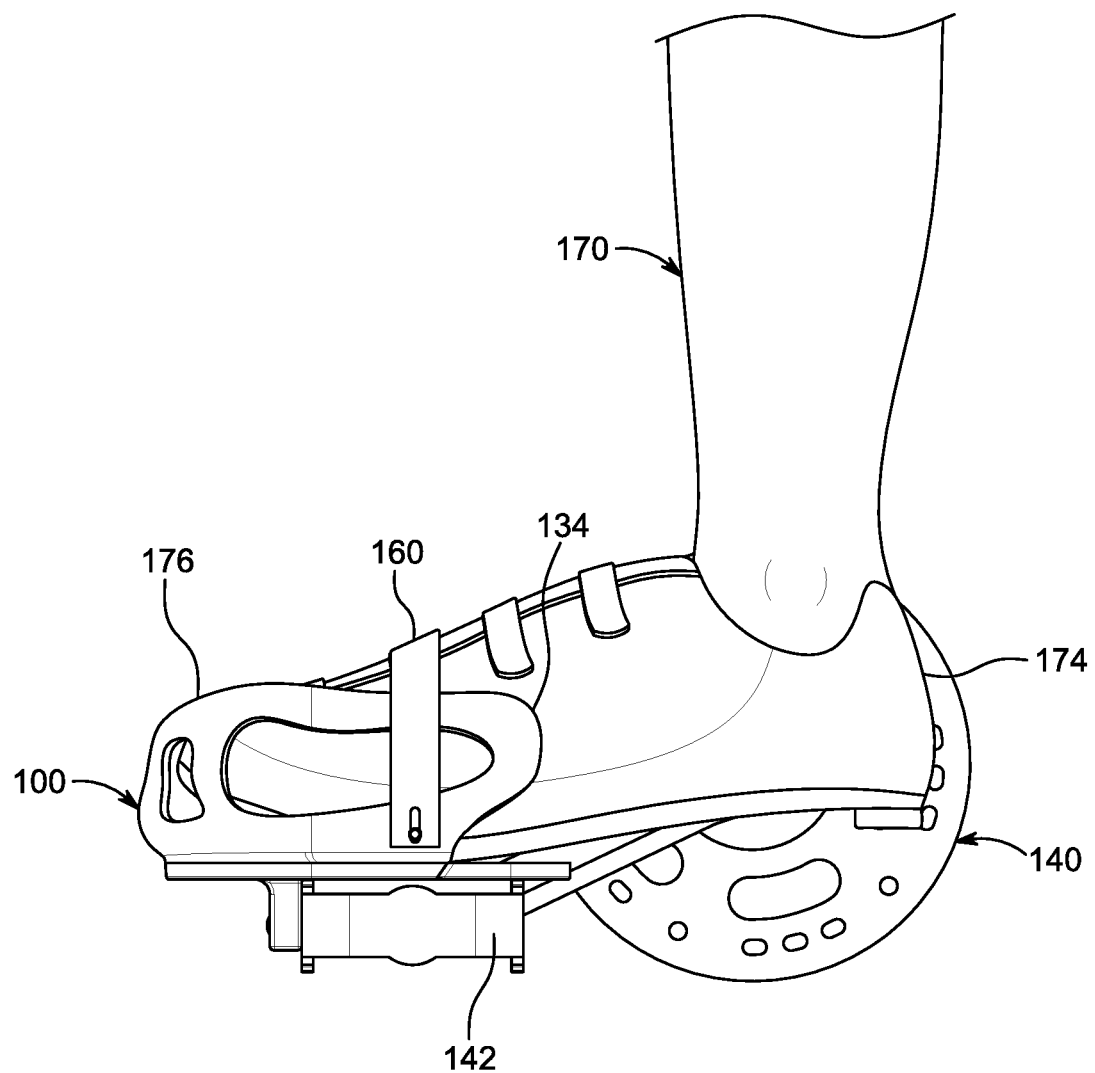
FIG. 2 is a diagram illustrating a left, side elevation view of the reconfigurable foot clip with the bicycle and the user of FIG. 1 in another mode.
Figure 3:
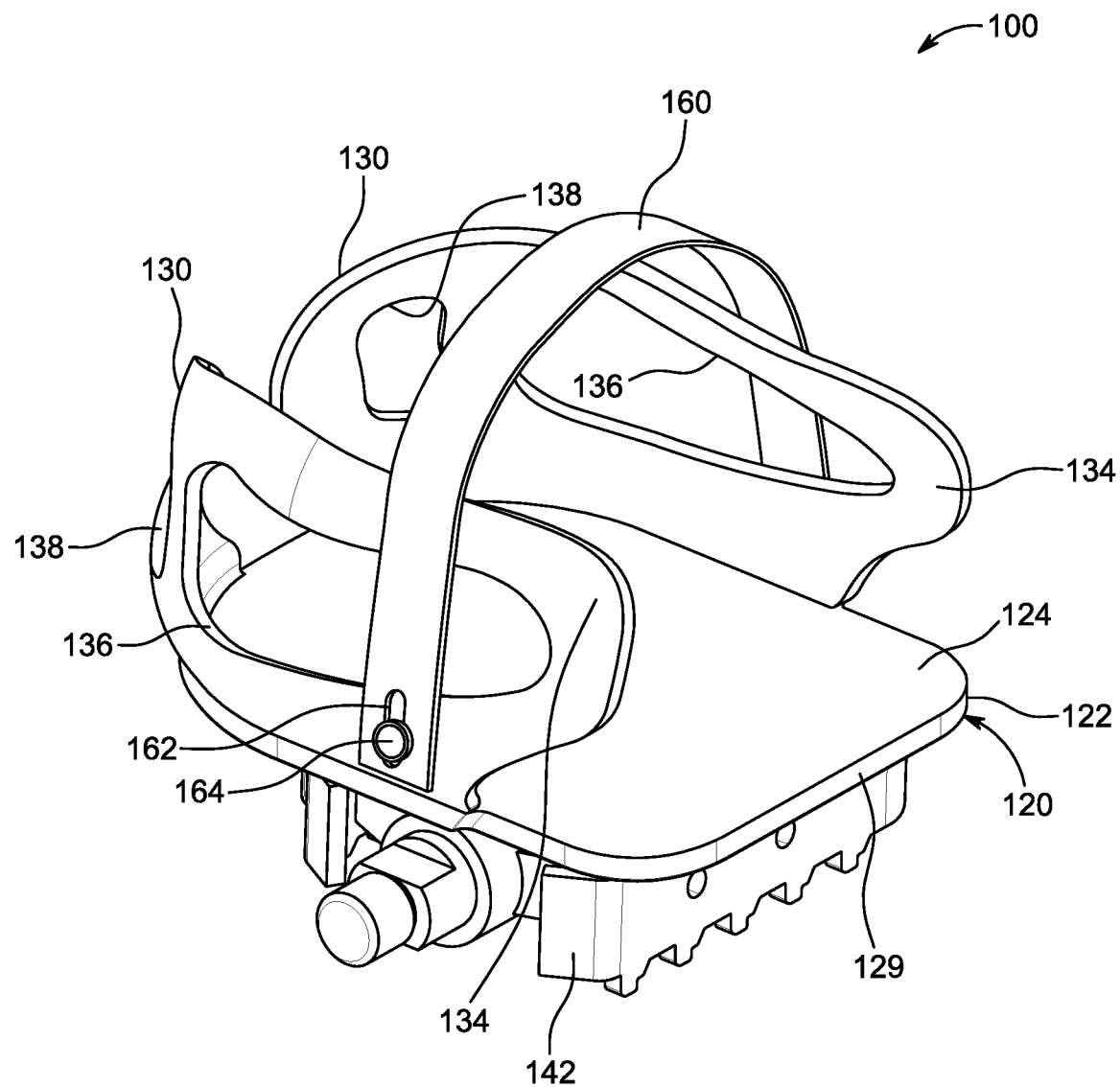
FIG. 3 is a diagram illustrating a rear, top, left side perspective view of the reconfigurable foot clip and a portion of the bicycle of FIG. 1.
Figure 4:
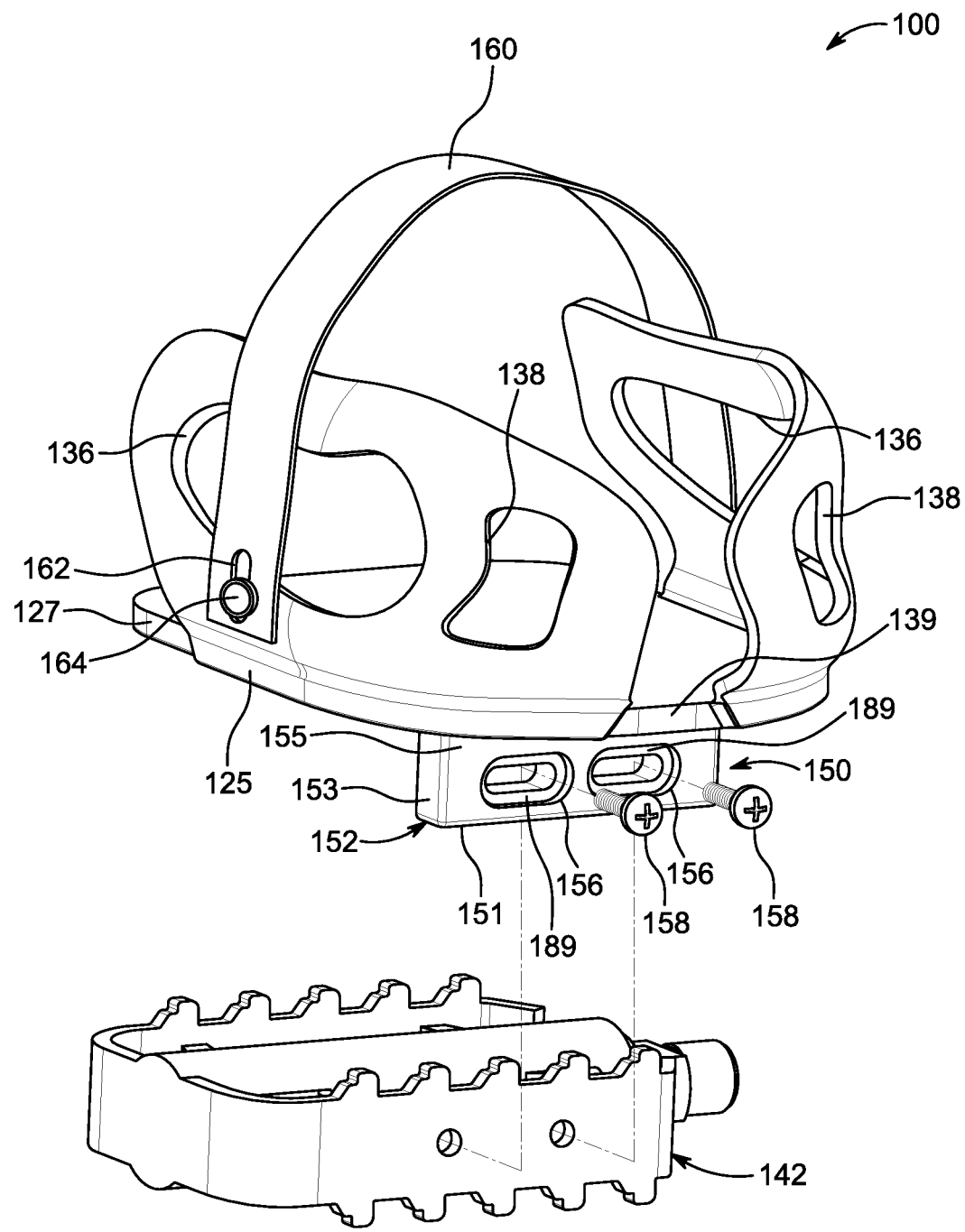
FIG. 4 is an exploded front, top, right side perspective view of the reconfigurable foot clip and the portion of the bicycle of FIG. 1.

A fastening member 150, shown in FIGS. 4-5, includes a bicycle abutment wall 152 extending downward from the bicycle abutment surface 124 and is operable to secure the reconfigurable foot clip 100 to a portion of a bicycle 140 in one of a plurality of modes, shown in FIGS. 1-2. The bicycle abutment wall 152 includes a wall front surface 155 opposite a wall abutment surface 154 and a wall first side surface 153 opposite a wall second side surface 157. The bicycle abutment wall 152 ends at a wall bottom surface 151.

The bicycle abutment wall 152 has a pair of openings 156 operable to receive a pair of fasteners 158 to fasten the foot clip 100 to the pedal 142 such that the wall abutment surface 154 abuts the pedal 142 when the foot clip 100 is fastened to the pedal 142. The pair of openings 156 is generally slot shaped, as shown in FIG. 9, which allows for adjustments in the positioning of the pair of fasteners 158. This allows the foot clip 100 to be installed on a variety of pedals 142 with different hole patterns. Each of the pair of fasteners 158 are nested, as shown in FIG. 5, due to an indented lip 189 of each of the pair of openings 156, shown in FIG. 4, providing for a low profile of each of the pair of fasteners 158. Each of the pair of fasteners 158 may be, but is not limited to, screws, rivets, and/or bolts. It is foreseen that the foot clip 100 may be coupled to the pedal 142 by other means, for example, by adhesion.

The foot clip 100 also includes a strap 160 operable to secure a user's foot 172 to the pedal 142. As shown in FIGS. 3-6 and 9-11, the strap 160 is coupled to the pair of sidewalls 130. The strap 160 extends from one of the pair of sidewalls 130 to the other of the pair of sidewalls 130 and arcs over the pair of sidewalls 130. It is also foreseen that the strap 160 may be coupled to another portion of the foot clip 100. In one example, the strap 160 is coupled to base 122. The strap 160 includes a pair of strap slot apertures 162 operable to receive a pair of strap fasteners 164 to couple the strap to the pair of sidewalls 130. It is foreseen that the strap 160 may be fastened to the pair of sidewalls 130 using, but not limited to, screws, rivets, bolts, or the like. It is also foreseen that the strap 160 may also be adhered to the pair of sidewalls 130. The strap 160 also pivots over the pair of sidewalls 130 to allow a user 170 to more easily place his or her foot 172 in the foot clip 100 before securing the strap 160 over the user's foot 172. The strap 160 is shown in one configuration in FIG. 11 and shown in a second configuration in FIG. 12. It is also foreseen that the strap 160 may be adjustable in length to accommodate a variety of foot sizes.

Each of the plurality of modes is defined by an orientation of the reconfigurable foot clip 100 and the bicycle 140. When one of the plurality of modes is selected, the orientation is defined when the fastening member 150 secures the foot clip 100 to the portion of the bicycle 140. The plurality of modes provides options to a user 170 to target certain muscles during exercise. In one example, shown in FIG. 1, the reconfigurable foot clip 100 is shown in a heel mode where the pair of sidewalls 130 is operable to at least partially surround and secure a heel 174 of a user's foot 172 to the bicycle 140 when the user 170 is mounted on the bicycle 140. The heel mode creates a heel strike against the pedal 142 on the foot abutment surface 124 when the user 170 presses the bottom of his or her foot down onto the pedal 142. With the pressure centered at the heel of the foot, the heel strike causes unique muscles to be targeted while pedaling the bicycle 140. In another example, shown in FIG. 2, the reconfigurable foot clip 100 is shown in a toe mode where the pair of sidewalls 130 is operable to at least partially surround and secure a toe 176 of a user's foot 172 to the bicycle 140 when the user 170 is mounted on the bicycle 140. Similarly, the toe mode creates a toe strike against the pedal 142 and may target overlapping and/or different muscles than the heel mode. It is foreseen that other modes may be provided to target specific groups or individual muscles.

In use, the foot clip 100 is secured to the pedal 142 by orienting the foot clip 100 in the desired mode on the pedal 142 such that the wall abutment surface 154 and the bicycle abutment surface 126 abut the pedal. The pair of fasteners 158 are positioned in the pair of wall openings 156 and fastened to the pedal 142. During heel mode, a user 170 inserts his or her foot 172 by inserting his or her toes 176 into the top of the foot clip 100 at the proximal end 121, through the strap 160, and past the distal end 123 until the user's heel 174 is nested in the pair of sidewalls 130. During toe mode, a user 170 inserts his or her toes at the distal end 123, under the strap 160, and to the proximal end 121 until the user's toes are nested in the pair of sidewalls 130. A user may then pedal using the toe, heel, or other mode.

It is foreseen that the foot clip 100 may be mounted on the pedal 142 in a way to allow the user 170 to select between a plurality of modes without removing the foot clip 100 from the pedal 142. For example, it is foreseen that the foot clip 100 can rotate from the heel mode to the toe mode without disconnecting the foot clip 100 from the pedal 142. In one example, the foot clip 100 includes a rod extending from the bicycle abutment surface 124 near the distal end 123 and the pedal 142 includes a cylindrical opening to receive the rod and to allow the foot clip 100 to pivot around the rod. The user 170 would only need to rotate the foot clip 100 to the desired mode. In another example, it is foreseen that two foot clips 100 may be mounted on opposite sides of the pedal 142 such that the foot clip 100 is oriented in the heel mode on one side of the pedal 142 and oriented in the toe mode on the other side of the pedal 142. In one example, the foot clip 100 is mounted in the heel mode on a first side of the pedal 142 and another foot clip 100 is mounted in the toe mode on a second side, opposite the first side, of the pedal 142. The user 170 would only need to rotate the pedal 142 to the desired mode. It is also foreseen that the pair of sidewalls 130 and the base 122 may be separate pieces that are available in different sizes for a customized fit.

Turning to FIGS. 13-21, another reconfigurable foot clip 200 coupled to a pedal 242, is illustrated. The foot clip 200 generally includes a foot receiver 220, a pair of sidewalls 230 extending from the foot receiver 220, and a fastening member 250. The foot receiver 220 is operable to receive a portion of a user's foot 172 during use and the pair of sidewalls 230 is operable to cradle and hold the user's foot 172 in the foot clip 200. The fastening member 250 is operable to fasten the foot clip 200 to the pedal 242.

Figure 16:
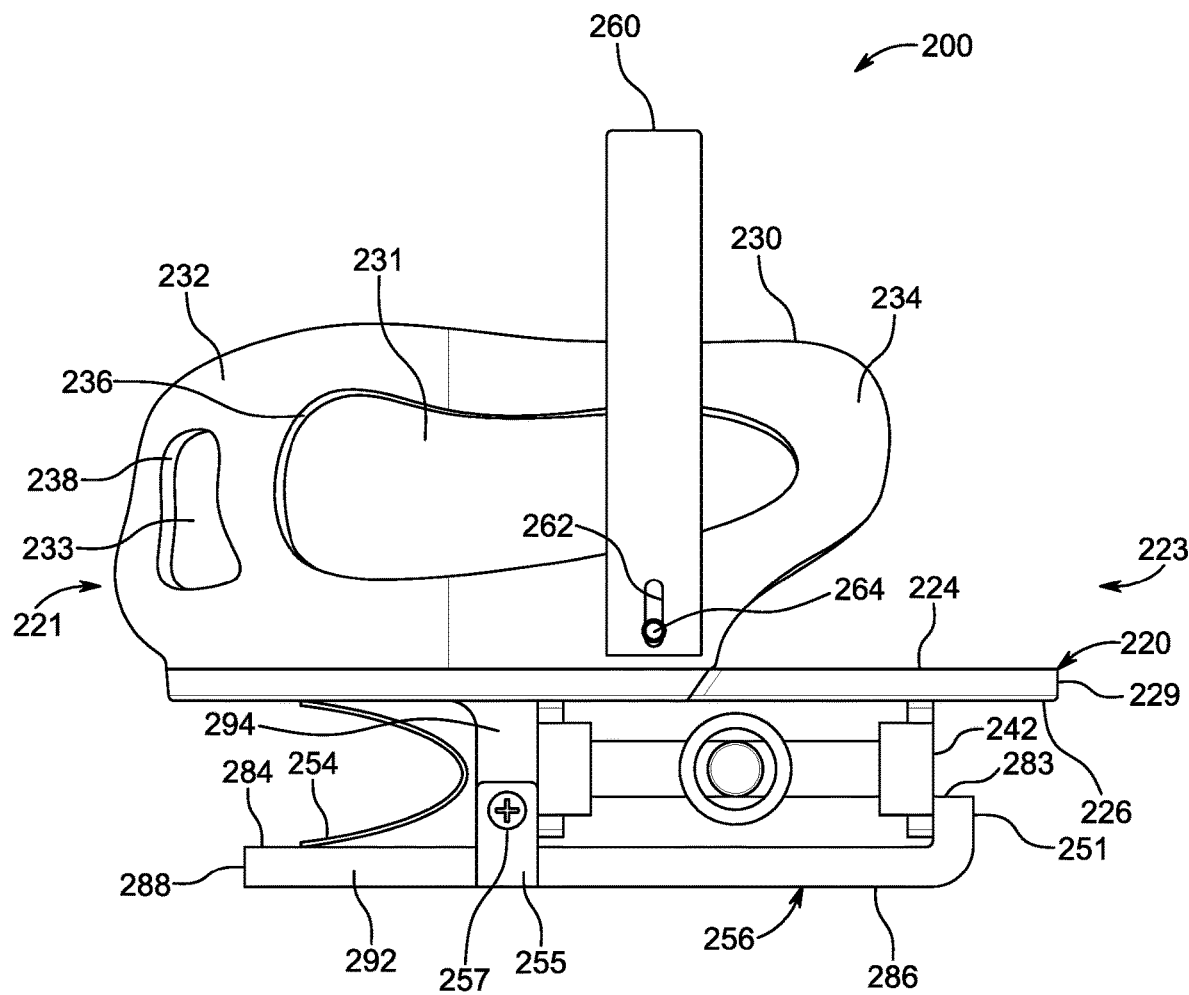
FIG. 16 is a left side elevation view of the reconfigurable foot clip with the portion of the bicycle of FIG. 13.
Figure 17:
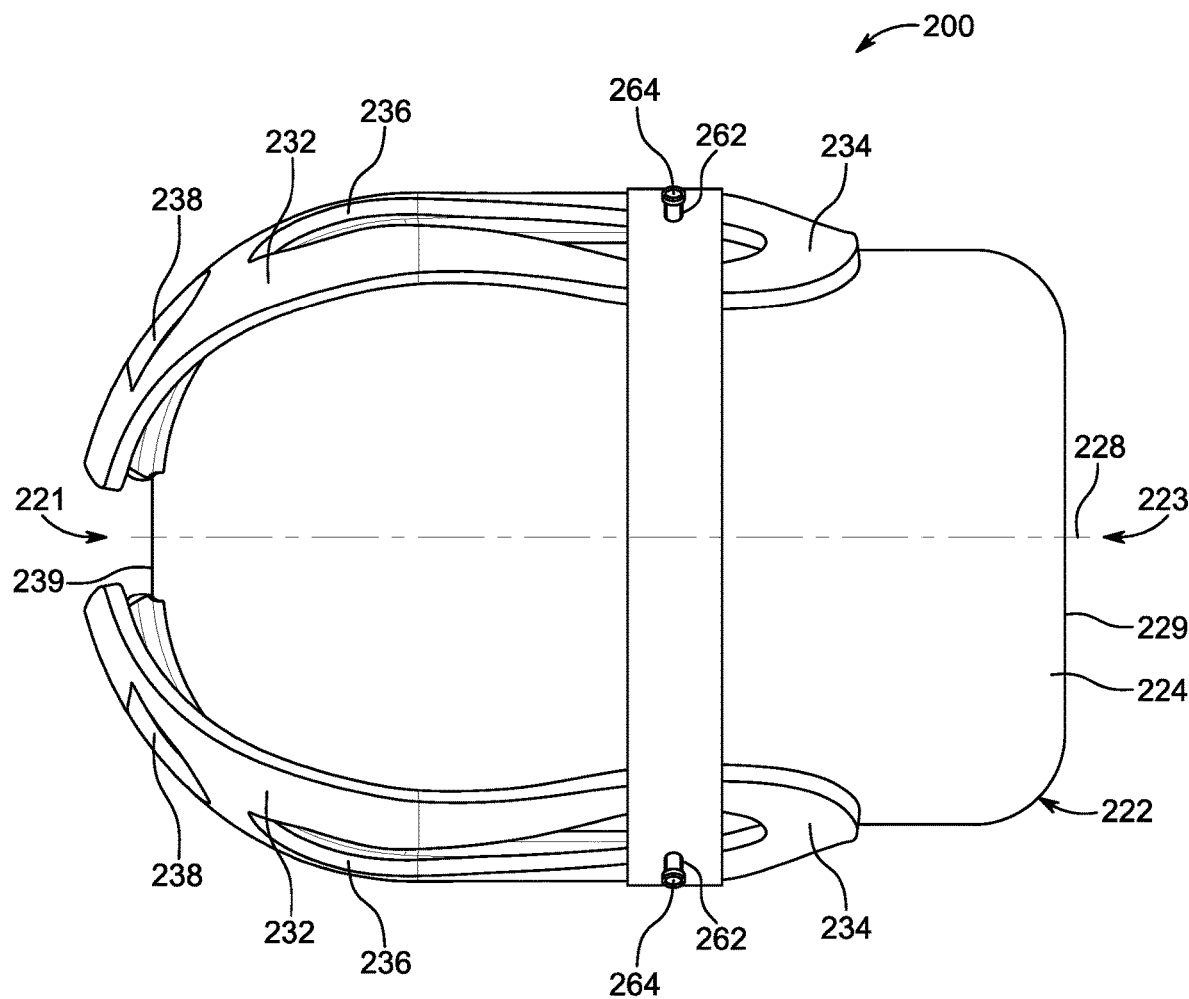
FIG. 17 is a top plan view of the reconfigurable foot clip of FIG. 13.
Figure 18:
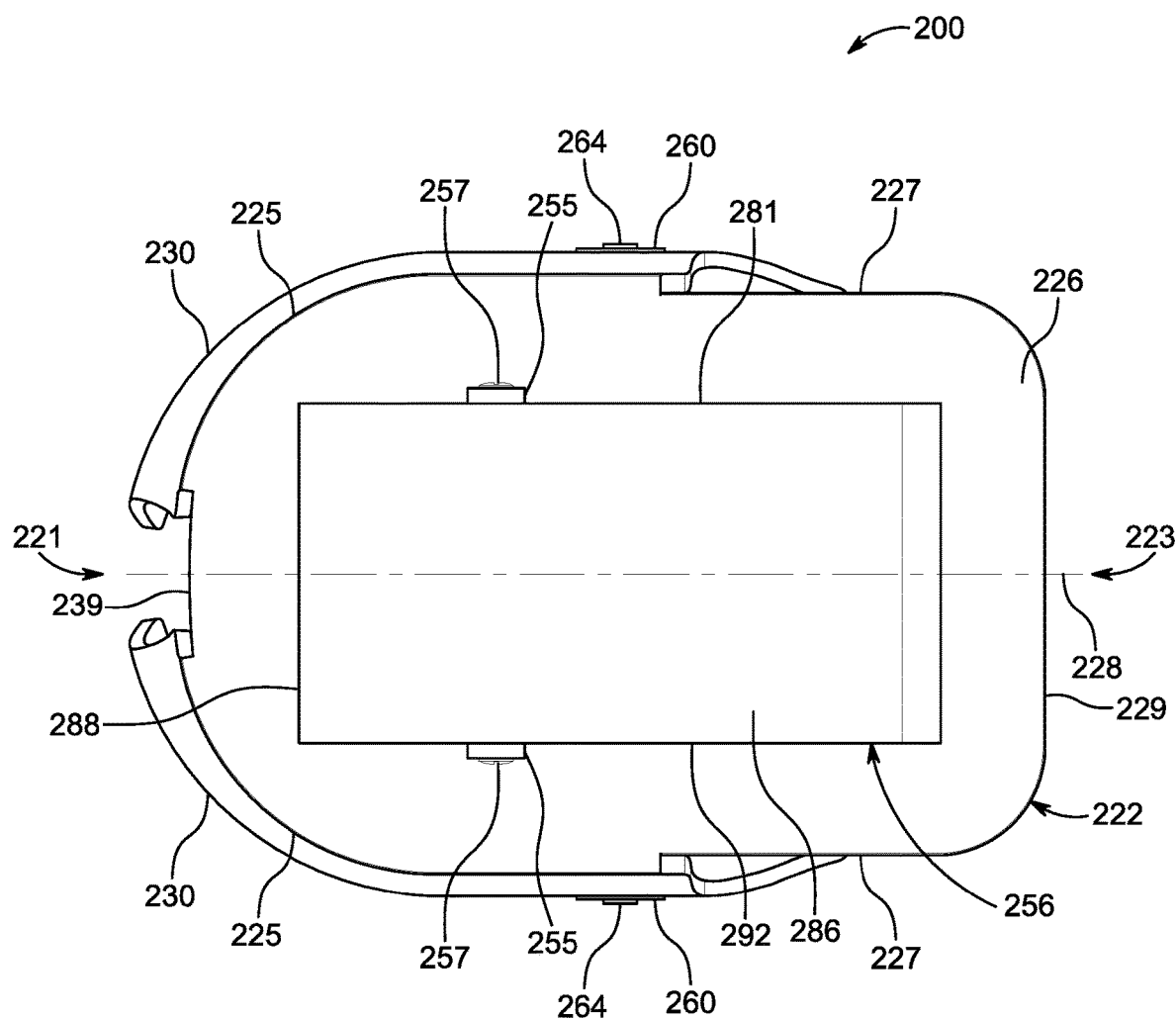
FIG. 18 is a bottom plan view of the reconfigurable foot clip of FIG. 13.
Figure 19:
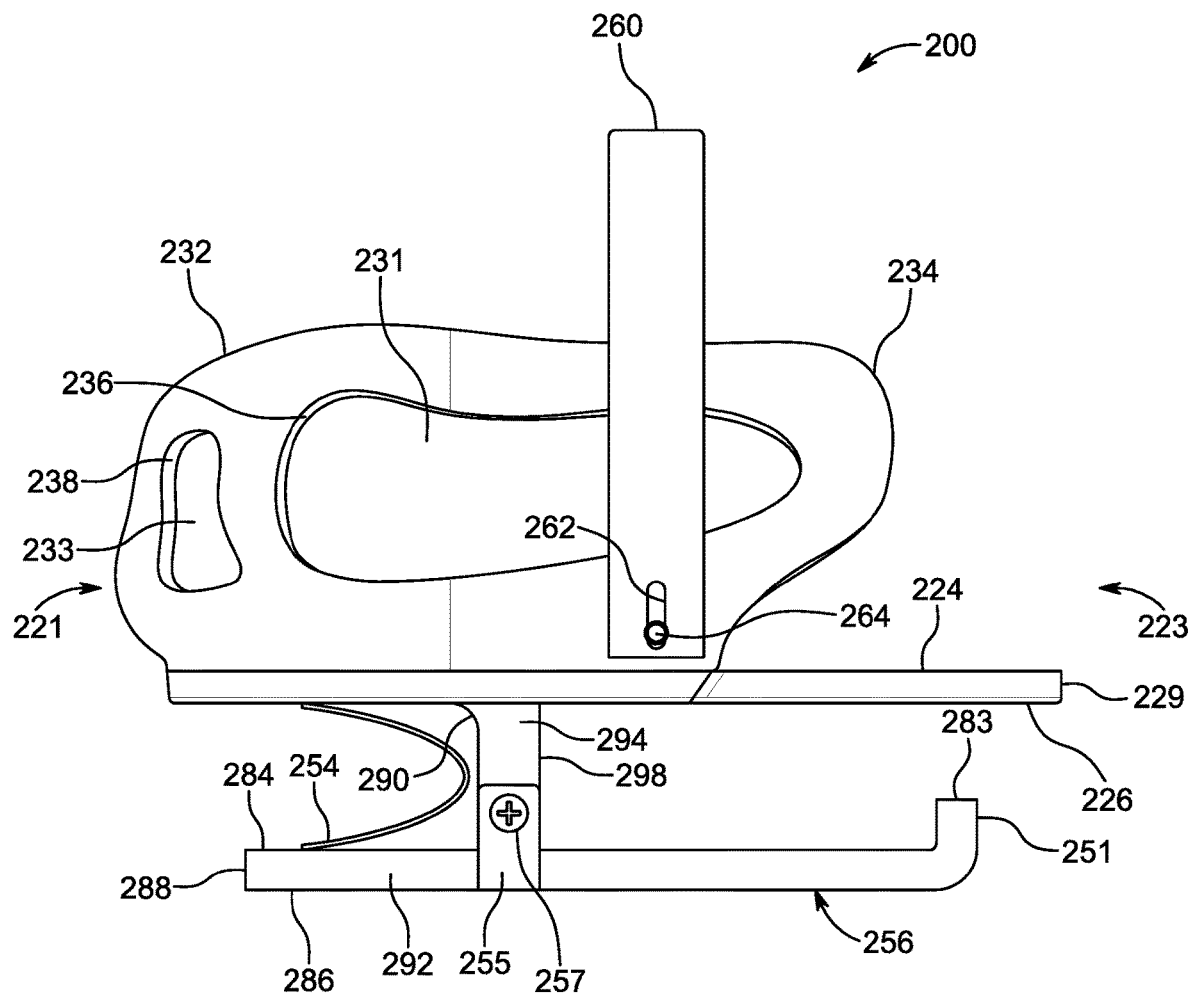
FIG. 19 is a left side elevation view of the reconfigurable foot clip of FIG. 13.

As shown more clearly in FIGS. 16-18, the foot receiver 220 includes a base 222 having a foot abutment surface 224 and a bicycle abutment surface 226 on opposite sides of the base 222. The foot receiver 220 may also have a center axis 228 extending from a proximal end 221 to a distal end 223 of the foot receiver 220, wherein the proximal end 221 is opposite the distal end 223. Portions of the bicycle abutment surface 226 abut the pedal 242 after installation. It is foreseen that the foot abutment surface 224 may include a surface providing grip to the user's foot 172 or a non-slip surface to prevent a user's foot 172 from slipping out of the foot clip 200. For example, the foot abutment surface 224 may have a rubberized surface.

The base 222 is be generally horseshoe shaped, as shown in the top plan view of FIG. 17, with a first pair of edges 225 at the proximal end 221 extending and curving away from the center axis 228. Each of the first pair of edges 225 then extend parallel to each other, defining a first width. The first pair of edges 225 then curves inwards to each other and connect to a second pair of edges 227 extending parallel to each other having a second width less than the first width. The second pair of edges 227 then curves towards each other and connects at the center axis 228, creating a flat edge 229 at the distal end 223. It is foreseen that the base 222 may be any shape including, but not limited to, square, triangular, circular, oval, or rectangular.

The reconfigurable foot clip 200 also includes a pair of sidewalls 230 extending upward from the foot abutment surface 224, as shown in FIGS. 14-17 and 19-21. Each pair of sidewalls 230 has an uppermost perimeter portion 232 extending toward another one of the pair of sidewalls 230. The pair of side walls 230 are operable to cradle and secure a user's foot 172 to the foot clip 200 by partially enclosing the user's foot 172 to the foot clip 200. In one example, the pair of sidewalls 230 cradles a user's heel 174. In another example, the pair of sidewalls 230 cradles a user's toes 176.

Figure 20:
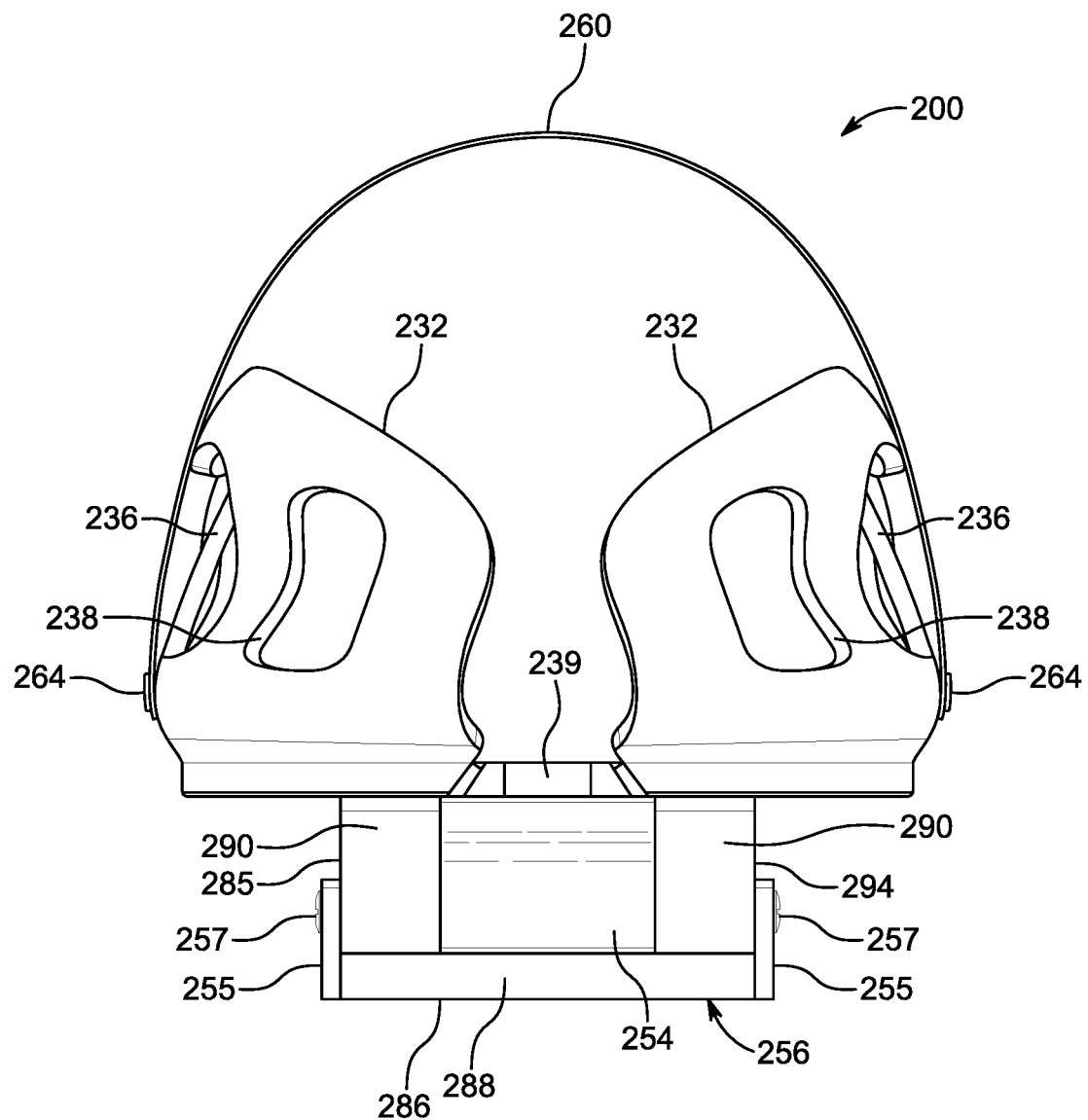
FIG. 20 is a front side elevation view of the reconfigurable foot clip of FIG. 13.
Figure 21:
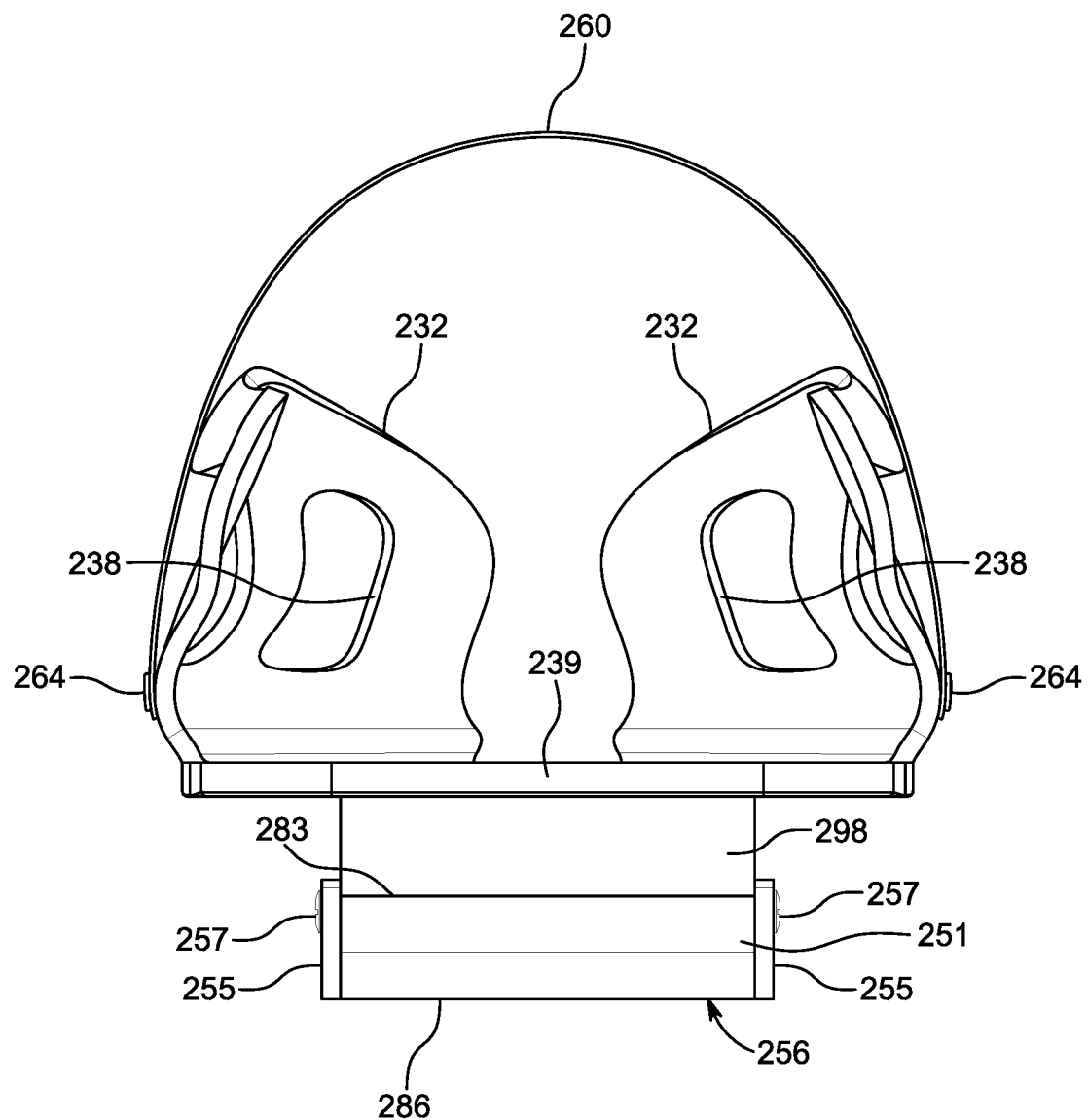
FIG. 21 is a rear side elevation view of the reconfigurable foot clip of FIG. 13.

Each pair of sidewalls 230 includes a wing 234 extending towards the distal end 223. The wing 234 extends above and over the base 222 such that the wing 234 and the base 222 are not connected, as shown in FIG. 20. The wing 234 provides additional side support to the user's foot 172 during use and also provides support for proper position and technique. For example, if a user's foot 172 is angled on the pedal 242, the user's full heel or toes may not be contacting the pedal, which may result in loss of power to the bicycle and inadvertent exercising of non-targeted muscles. It is foreseen that each of the pair of sidewalls 230 may not include a wing 234 or may include a wing 234 connected to the base 222. It is also foreseen that one of the pair of sidewalls 230 may have a wing 234 while the other of the pair of sidewalls 230 does not have a wing.

Each pair of sidewalls 230 also includes a first aperture 231 having a first aperture edge 236 and a second aperture 233 having a second aperture edge 238. The first aperture 231 is larger than the second aperture 238 and extends into the wing 234. The first aperture 231 is generally shaped as an elongated oval with the first aperture edge 236 being more circular closer to the second aperture 233 and tapered in the wing 234, as shown in FIG. 16. The second aperture 233 is positioned near the proximal end 221 and generally kidney shaped, as shown in FIG. 20. The first aperture 231 and the second aperture 233 provide for flexibility in the sidewalls 230, resulting in a better fit for a larger variety of sizes and shape, as well as breathability to the user's foot 272. It is foreseen that the first aperture 231 and the second aperture 233 may be any shape or size. It is also foreseen that the second aperture 233 may be larger than the first aperture 231 or that the second aperture 233 may be equal in size and/or shape than the first aperture 231.

The pair of sidewalls 230 does not connect, which also allows for more flexibility. As shown in FIGS. 17 and 20, the side walls extend along the first pair of edges 225 towards the proximal end 221 and terminate near the center axis 228, leaving a gap 239. The gap 239 allows for the pair of sidewalls 230 to extend away from each other for a larger foot or extend towards each other to create a tighter fit for a smaller foot. Near the distal end 223, the pair of sidewalls 230 terminate before the flat edge 229, allowing for an area where user's foot 172 can be inserted into the foot clip 200. It is foreseen that the pair of sidewalls 230 may be connected.

A fastening member 250, shown in FIGS. 13-16 and 18-21, has a bicycle abutment wall 252 extending downward from the bicycle abutment surface 226 and is operable to secure the reconfigurable foot clip 200 to a portion of a bicycle 140 in one of a plurality of modes, shown in FIGS. 1-2. The bicycle abutment wall 252 includes a wall front surface 280 opposite a wall abutment surface 298 and a wall first side surface 294 opposite a wall second side surface 285. The bicycle abutment wall 252 ends at a wall bottom surface 296. The wall abutment surface 298 abuts the pedal 242 when the foot clip 200 is fastened to the pedal 242. The bicycle abutment wall 252 includes a pair of threaded wall openings 253 configured to receive a pair of bar fasteners 257. It is foreseen that the bicycle abutment wall 252 may have an opening 253 extending through the bicycle abutment wall 252 from the wall first side surface 294 to the wall second side surface 285 operable to receiver either two fasteners on each side or a single rod.

The fastening member 250 also has a bar 256 and a spring 254 to form a spring biased hinge. The bar 256 is generally rectangular shaped, as shown in FIG. 18, and includes a bar abutment surface 284 opposite a bar bottom surface 286 and a bar first side surface 292 opposite a bar second side surface 281. The bar abutment surface 284 is operable to abut the pedal 242 after installation. The bar 256 also includes a bar front surface 288. The bar 256 bends at the end opposite to the bar front surface 288 into bar lip 251 having a bar rear surface 283. The bar lip 251 is operable to prevent the pedal 242 from moving out of the bar 256 and foot clip 200 when the bar 256 is installed on the pedal 242 and in the closed position, shown in FIG. 13. It is foreseen that the bar 256 may be any shape including, but not limited to, a square, oval, or triangle. The bar 256 also includes a pair of tabs 255, each of the pair of tabs 255 includes a tab opening 259 operable to receive the pair of bar fasteners 257. It is foreseen that the bar 256 may be fastened to the bicycle abutment wall 252 by other means including, but not limited to, screws, rivets, bolts, or the like.

Figure 14:
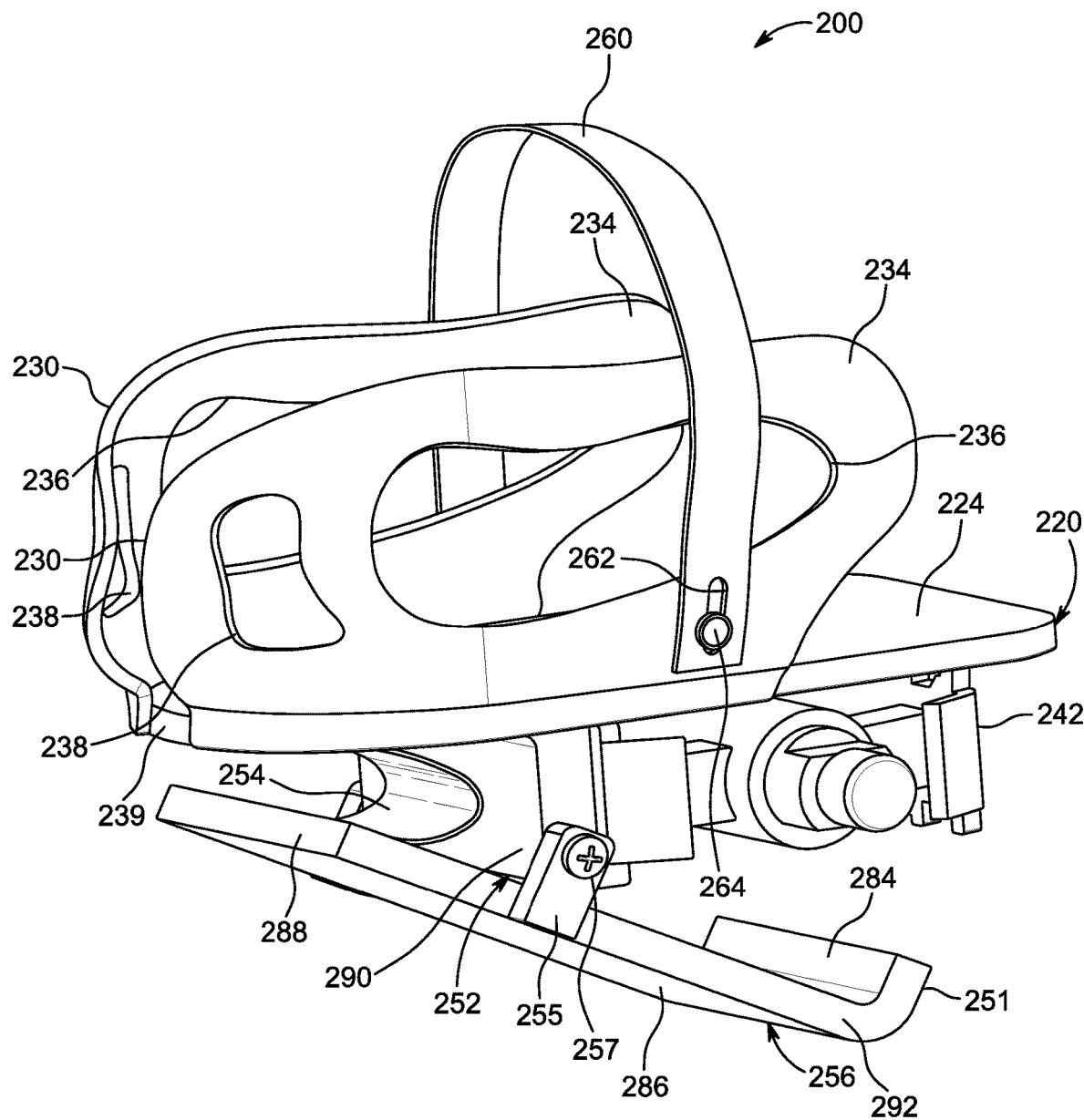
FIG. 14 is a diagram illustrating a front, top, left side perspective view of the reconfigurable foot clip with the portion of the bicycle of FIG. 13 with a bar in another configuration.
Figure 15:
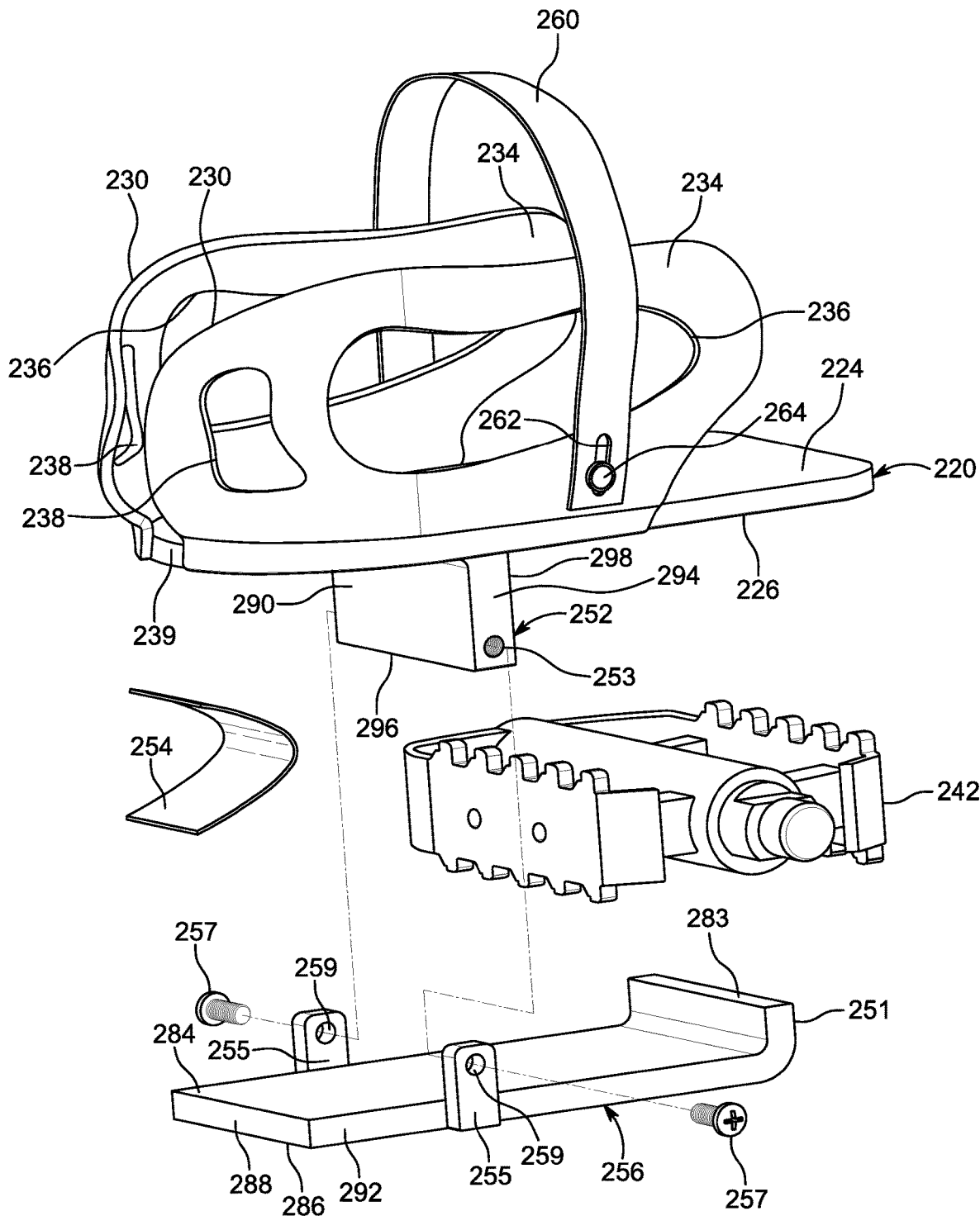
FIG. 15 is an exploded front, top, left side perspective view of the reconfigurable foot clip with the portion of the bicycle of FIG. 13.

To move the bar 256 to the open position, shown in FIG. 14, an upward force is applied to the bar 256 near or at the second end 282, which compresses the spring and pivots the bar 256 at the bicycle abutment wall 252. In one example, the upward force is a result of the user pinching the bar with his or her fingers. During installation, the bar 256 is held in the open position until the foot clip 200 is positioned over the pedal 242 and the bar 256 cradles the pedal 242. The bar 256 then moves to closed position to secure the foot clip 200 to the pedal 242.

The foot clip 200 also includes a strap 260 operable to secure a user's foot 172 to the pedal 242. As shown in FIGS. 13-17 and 19-21, the strap 260 is coupled to the pair of sidewalls 230. The strap 260 extends from one of the pair of sidewalls 230 to the other of the pair of sidewalls 230 and arcs over the pair of sidewalls 230. It is also foreseen that the strap 260 may be coupled to another portion of the foot clip 200. In one example, the strap 260 is coupled to base 222. The strap 260 includes a pair of strap slot apertures 262 operable to receive a pair of strap fasteners 264 to couple the strap to the pair of sidewalls 230. It is foreseen that the strap 260 may be fastened to the pair of sidewalls 230 using, but not limited to, screws, rivets, bolts, or the like. It is also foreseen that the strap 260 may also be adhered to the pair of sidewalls 230. The strap 260 also pivots over the pair of sidewalls 230 to allow a user 170 to more easily place his or her foot 172 in the foot clip 200 before securing the strap 260 over the user's foot 272. It is also foreseen that the strap 160 may be adjustable in length to accommodate a variety of foot sizes.

Each of the plurality of modes is defined by an orientation of the reconfigurable foot clip 200 and the bicycle 240. When one of the plurality of modes is selected, the orientation is defined when the fastening member 250 secures the foot clip 200 to the portion of the bicycle 140, shown in FIGS. 1-2. The plurality of modes provides options to a user 170 to target certain muscles during exercise.

In use, the foot clip 200 is secured to the pedal 242 by orienting the foot clip 200 in the desired mode on the pedal 242 such that the wall abutment surface 254 abut the pedal. The bar 256 is pinched to compress the spring 254 until the bar 256 is in the open position. The foot clip 200 is then positioned over the pedal 242 and the force on the bar 256 is released, resulting in the spring 254 pushing the bar 256 into the closed position. During heel mode, a user 170 inserts his or her foot 172 by inserting his or her toes 176 into the top of the foot clip 200 at the proximal end 221, through the strap 260, and past the distal end 223 until the user's heel 174 is nested in the pair of sidewalls 230. During toe mode, a user 170 inserts his or her toes at the distal end 223, under the strap 260, and to the proximal end 221 until the user's toes are nested in the pair of sidewalls 230. A user may then pedal using the toe, heel, or other mode.

In this manner, the foot clips 100, 200 advantageously provide personal trainers with a new exercise, thereby allowing the personal trainers to enhance their clients' workout experience. Further, during testing of the present inventive concept, it was discovered that the present inventive concept advantageously targets muscles, e.g., gluteus maximus in the heel mode, significantly better than other traditional exercises, e.g., bicycling using conventional devices. By targeting muscles, the foot clips 100, 200 advantageously provide a more efficient workout, by allowing users to meet their workout goals more quickly and easier than traditional workouts.

One of skill in the art will recognize that the described examples are not limited to any particular size. Further, one of skill in the art will recognize that the components of the foot clips 100, 200 are not limited to any type of material. In a preferred example, the foot clip, e.g., any one or more of the foot clips 100, 200 is formed of one or more plastics, but may be formed of a variety of different materials including metal or the like or rubber or the like, or a combination thereof. One skilled in the art will recognize that different diameters, types, and thicknesses of preferred materials can be utilized when taking into consideration design and stability considerations. A number of manufacturing techniques may be used such as the molding, machining, and/or casting one or more components of the foot clip. An example process of manufacturing the foot clips 100, 200 includes use of an injection molding process or other like manufacturing means.

It will be appreciated by those skilled in the art that changes could be made to the embodiments described above without departing from the broad inventive concept thereof. It is understood, therefore, that the present invention disclosed herein is not limited to the particular embodiments disclosed, and is intended to cover modifications within the spirit and scope of the present invention.

What is claimed is:

1. A reconfigurable foot clip comprising:
   a foot receiver having (i) a base with a foot abutment surface and a bicycle abutment surface on opposite sides of the base, and (ii) a center axis extending from a proximal end to a distal end of the foot receiver;
   a pair of sidewalls extending upward from the foot abutment surface, each of the pair of sidewalls having an uppermost perimeter portion extending toward another one of the pair of sidewalls; and
   a fastening member (i) having a bicycle abutment wall extending downward from the bicycle abutment surface, and (ii) operable to secure the reconfigurable foot clip to a portion of a bicycle in one of a plurality of modes, each of the plurality of modes defined by an orientation of the reconfigurable foot clip to the bicycle,
   wherein,
   the plurality of modes includes (i) a heel mode with the pair of sidewalls operable to at least partially receive a heel of a user's foot, and (ii) a toe mode with the pair of sidewalls operable to at least partially receive a toe of the user's foot, each of the pair of sidewalls extend over the bicycle abutment wall and the portion of the bicycle in each of the plurality of modes, the pair of sidewalls partially surround and secure the heel of the user's foot and extend past an ankle of the user's foot in the heel mode, and the uppermost perimeter portion of each of the pair of sidewalls extends continuously (i) from in front of the ankle, (ii) along an entire side of the ankle, and (iii) to behind the ankle of the user's foot in the heel mode so that the uppermost perimeter portion of each of the pair of sidewalls collectively encompass most sides of the ankle of the user's foot in the heel mode.

2. The reconfigurable foot clip of claim 1, wherein,
the pair of sidewalls partially surround and secure the toe of the user's foot and do not extend past the ankle of the user's foot in the toe mode.

3. The reconfigurable foot clip of claim 1, wherein,
one of the plurality of modes is selected and the orientation is defined when the fastening member secures the reconfigurable foot clip to the bicycle.

4. The reconfigurable foot clip of claim 1, wherein,
the portion of the bicycle is a pedal of the bicycle.

5. The reconfigurable foot clip of claim 1, wherein,
each of the pair of sidewalls has a wing extending towards the distal end.

6. The reconfigurable foot clip of claim 5, wherein,
each of the pair of sidewalls has at least one opening.

7. The reconfigurable foot clip of claim 1, wherein,
the reconfigurable foot clip includes a strap coupled to the pair of sidewalls.

8. The reconfigurable foot clip of claim 1, wherein,
the bicycle abutment wall has at least one opening operable to receive a fastener.

9. The reconfigurable foot clip of claim 1, wherein,
the uppermost perimeter portion of each of the pair of sidewalls extends toward each other behind the ankle of the user's foot in the heel mode to define a gap extending between the uppermost perimeter portion of each of the pair of sidewalls, and
the gap has a variable width.

10. A reconfigurable foot clip comprising:
a foot receiver having (i) a base with a foot abutment surface and a bicycle abutment surface on opposite sides of the base, and (ii) a center axis extending from a proximal end to a distal end of the foot receiver;
a pair of sidewalls extending upward from the foot abutment surface, each of the pair of sidewalls having an uppermost perimeter portion extending toward another one of the pair of sidewalls;
a fastening member (i) having a bicycle abutment wall extending downward from the bicycle abutment surface, (ii) spaced from each of the proximal end and the distal end of the foot receiver, and (iii) operable to secure the reconfigurable foot clip to a portion of a bicycle in one of a plurality of modes, each of the plurality of modes defined by an orientation of the reconfigurable foot clip and the bicycle; and
a strap extending from one of the pair of sidewalls to another of the pair of sidewalls.

11. A method of exercising using a reconfigurable foot clip, the method comprising:
securing the reconfigurable foot clip to a portion of a bicycle in one of a plurality of modes, each of the plurality of modes defined by an orientation of the reconfigurable foot clip to the bicycle, the plurality of modes including (i) a heel mode with a pair of sidewalls operable to at least partially receive a heel of a user's foot, and (ii) a toe mode with the pair of sidewalls operable to at least partially receive a toe of the user's foot,
wherein,
the reconfigurable foot clip includes a foot receiver having (i) a base with a foot abutment surface and a bicycle abutment surface on opposite sides of the base, and (ii) a center axis extending from a proximal end to a distal end of the foot receiver,
the pair of sidewalls extend upward from the foot abutment surface,
the reconfigurable foot clip includes a fastening member having a bicycle abutment wall extending downward from the bicycle abutment surface, and
each of the pair of sidewalls extend over the bicycle abutment wall and the portion of the bicycle in each of the plurality of modes.

12. The method of claim 11, wherein,
the pair of sidewalls partially surround and secure the heel of the user's foot and extend past an ankle of the user's foot in the heel mode, and
the pair of sidewalls partially surround and secure the toe of the user's foot and extend past the ankle of the user's foot in the toe mode.

13. The method of claim 11, wherein,
one of the plurality of modes is selected and the orientation is defined when the fastening member is secured the foot clip to the bicycle.

14. The method of claim 11, wherein,
the portion of the bicycle is a pedal of the bicycle.

15. The method of claim 11, wherein,
the proximal end is opposite the distal end.

16. The method of claim 15, wherein,
each of the pair of sidewalls has a wing extending towards the distal end.

17. The method of claim 16, wherein,
each of the pair of sidewalls has at least one opening.

18. The method of claim 11, wherein,
the reconfigurable foot clip includes a strap coupled to the pair of sidewalls.

19. The method of claim 11, wherein,
a strap extends from one of the pair of sidewalls to another of the pair of sidewalls.

20. The method of claim 11, wherein,
the bicycle abutment wall has at least one opening operable to receive a fastener.

* * * * *